United States Patent [19]

Yamada et al.

[11] 4,106,446

[45] Aug. 15, 1978

[54] INTERNAL COMBUSTION ENGINE WITH AUXILIARY COMBUSTION CHAMBER

[75] Inventors: Masatoshi Yamada, Nagoya; Yujiro Oshima, Ichinomiya; Katsuhiko Hattori; Hideyuki Suzuki, both of Nagoya, all of Japan

[73] Assignee: Kabushiki Kaisha Toyota Chuo Kenkyusho, Japan

[21] Appl. No.: 554,229

[22] Filed: Feb. 28, 1975

[30] Foreign Application Priority Data

Feb. 28, 1974 [JP] Japan .................. 49-23830

[51] Int. Cl.² ................... F01L 9/02
[52] U.S. Cl. ................ 123/90.13; 123/75 B; 123/90.12
[58] Field of Search ............ 123/90.12, 90.13, 32 SJ, 123/32 ST, 75 B, 32 SP, 32 C, 33 VC, 48 D, 191 S

[56] References Cited

U.S. PATENT DOCUMENTS

| | | | |
|---|---|---|---|
| 1,473,077 | 11/1923 | Bull | 123/90.12 |
| 2,070,769 | 2/1937 | Wurtele | 123/90.12 |
| 2,190,348 | 2/1940 | Bach | 123/48 D |
| 2,444,083 | 6/1948 | Anderson | 123/90.13 |
| 2,602,434 | 7/1952 | Barnaby | 123/90.12 |
| 2,703,076 | 3/1955 | Chaude | 123/90.13 |
| 2,728,332 | 12/1955 | Troberg | 123/48 D |
| 2,827,884 | 3/1958 | Stivender | 123/90.12 |
| 2,962,013 | 11/1960 | Reggio | 123/90.12 |
| 3,534,718 | 10/1970 | Pasquin | 123/90.13 |
| 3,580,231 | 5/1971 | Bradbury | 123/33 VC |
| 3,763,834 | 10/1973 | Geiger | 123/32 SP |
| 3,882,830 | 5/1975 | Kume | 123/32 ST |
| 3,905,343 | 9/1975 | Ryan | 123/191 S |

Primary Examiner—Charles J. Myhre
Assistant Examiner—David D. Reynolds
Attorney, Agent, or Firm—Oblon, Fisher, Spivak, McClelland & Maier

[57] ABSTRACT

An internal combustion engine with an auxiliary combustion chamber is provided with a main combustion chamber for the combustion of an air-fuel mixture, an auxiliary combustion chamber communicating with the main combustion chamber through a passage, such that the ignition of an air-fuel mixture in the auxiliary combustion chamber induces ignition and combustion of the air-fuel mixture in the main combustion chamber, and an intake valve provided in the auxiliary combustion chamber for opening and closing a passage which leads to a fuel supply means. The engine further includes an intake valve lifter having a piston member which is associated with the intake valve and a cylinder member in which such piston member moves, a fluid pressure supply device driven in synchronism with the rotation of the engine to supply a fluid pressure, and a fluid pressure supply passage for feeding the fluid pressure which is supplied by the fluid pressure supply device to the intake valve lifter. Accordingly, the control of the opening and closing operations of the intake valve of the auxiliary combustion chamber can be performed in accordance with any driving conditions by feeding the fluid pressure supplied by the fluid pressure supply device to the intake valve lifter through the fluid pressure supply passage and moving the piston member in synchronism with the rotation of the internal combustion engine.

2 Claims, 23 Drawing Figures

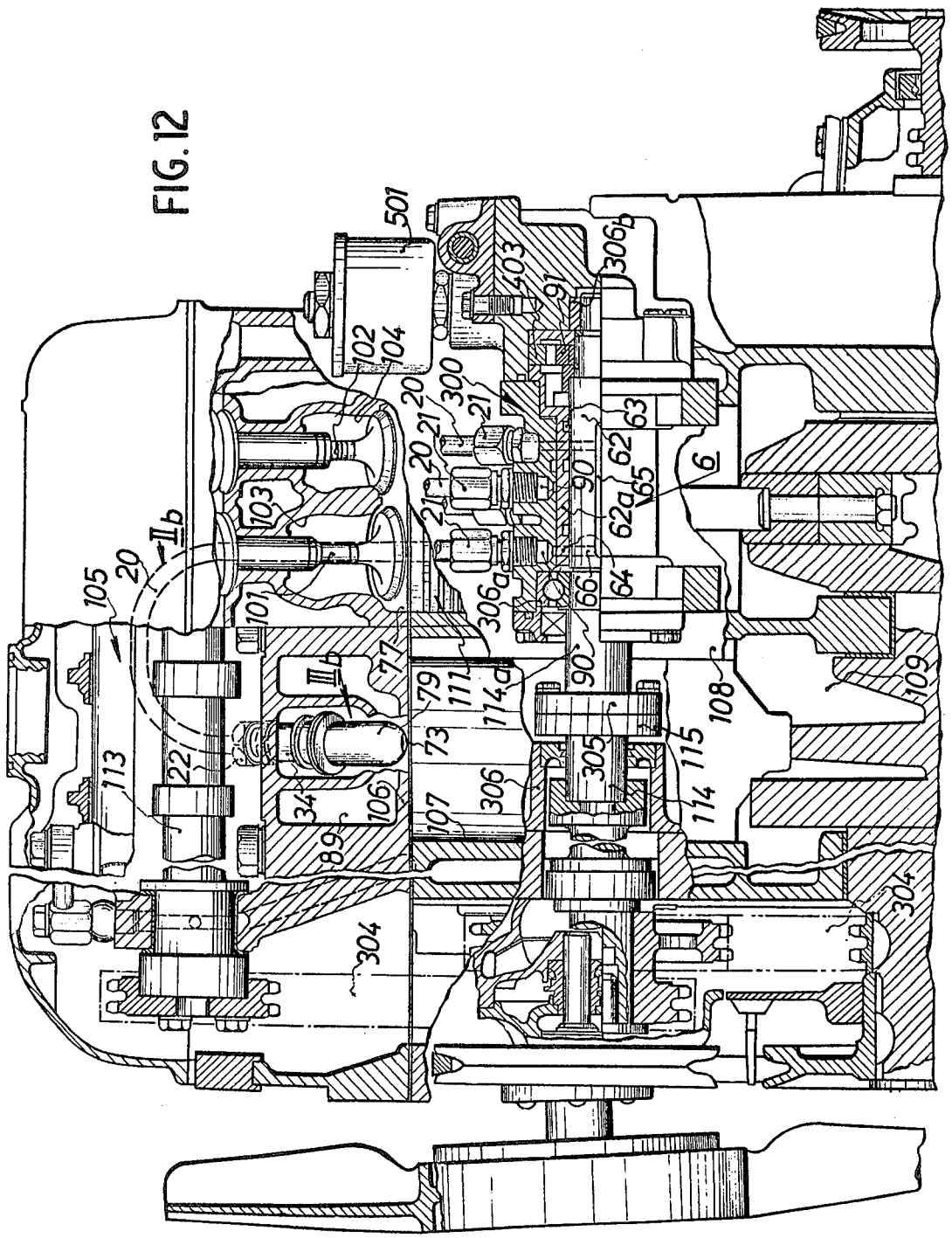

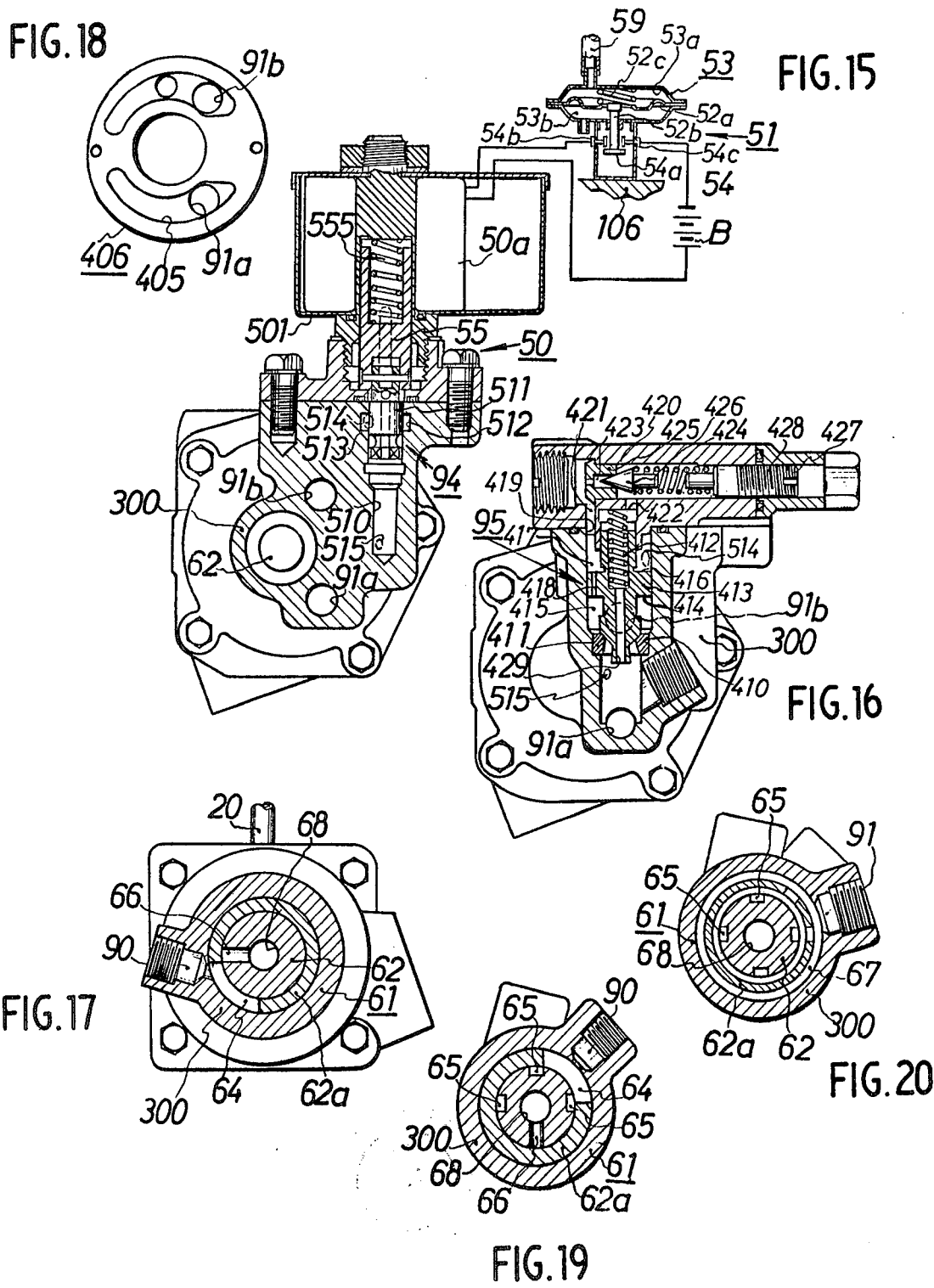

INTERNAL COMBUSTION ENGINE WITH AUXILIARY COMBUSTION CHAMBER

BACKGROUND OF THE INVENTION

1. Field of the Invention:

This invention relates generally to an internal combustion engine of the type having an auxiliary combustion chamber in addition to a main combustion chamber, and more particularly to an internal combustion engine as characterized herein which has a hydraulic circuit for controlling the opening and closing operations of an intake valve or valves of the auxiliary combustion chamber or chambers.

2. Description of the Prior Art:

In internal combustion engines having an auxiliary combustion chamber in addition to a main combustion chamber, it has been the conventional practice to provide a mechanical valve operating mechanism for controlling the opening and closing operations of the intake valves of the auxiliary combustion chambers separately from the valve operating mechanism for the intake and exhaust valves of the main combustion chamber, or to modify the valve operating mechanism of the main combustion chamber so as to simultaneously control the opening and closing operation of the intake valves of the respective auxiliary combustion chambers.

Where an independent mechanical valve operating mechanism is employed for the control of the opening and closing operations of the intake valves of the auxiliary combustion chambers, it is necessary to mount the mechanical valve operating mechanism separately from and independently of the mechanical valve operating mechanism of the main combustion chamber. However, this imposes various limitations on the engine design, since the rotational driving force of the engine has to be transmitted mechanically to the valve operating mechanism of the auxiliary combustion chambers through a crank shaft or a shaft which is driven by the main crankshaft or by a chain or gear driving the valve operating mechanism of the main combustion chamber. Furthermore, it is extremely difficult to dispose the valve operating mechanism in the limited space between the cylinder head and the head cover of the engine. As a result, it is difficult to locate the auxiliary combustion chamber in an optimum position relative to the main combustion chamber from the standpoint of combustion. In addition, the internal combustion engine having an auxiliary chamber has a design or construction completely different from ordinary internal combustion engines, which have only the main combustion chambers, and also requires many new component parts, including camshafts, rocker arms and the like, such that development thereof requires a vast investment in the way of production facilities.

In case the valve operating mechanism for the main combustion chamber is modified to simultaneously control the opening and closing operations of the intake valve of the auxiliary combustion chamber, such great changes in structural design are unnecessary, but the problem of spatial limitation for the location of the auxiliary combustion chamber becomes even more severe and other similar problems also arise.

The mechanical valve control has other inherent drawbacks in addition to those which are mentioned hereinbefore. For example, it is difficult to vary the lifting or open period of the intake valve, such that the variable mechanism of complicated construction and high precision is required. Furthermore, by means of the mechanical valve control, it is almost impossible to hold the intake valve continuously in a closed or open position under certain operating conditions of the engine, such as, for example, under engine braking conditions or at the time of sudden acceleration conditions, and so forth.

SUMMARY OF THE INVENTION

Accordingly, it is an object of the present invention to provide an improved internal combustion engine of the type having an auxiliary combustion chamber, in which the valve driving force is delivered through hydraulic conduits to simplify the power transmission mechanisms to a significant degree, without imposing limitations on the mounting position of the auxiliary combustion chamber.

Another object of the present invention is to provide an improved mechanism or system for varying the lifting and opening periods of the intake valve of the auxiliary combustion chamber in an internal combustion engine characterized by such an auxiliary chamber.

Yet another object of the present invention is to provide an internal combustion engine characterized by a plurality of auxiliary combustion chambers and in which improved means are provided for controlling the opening and closing of the intake valves of the auxiliary combustion chambers in a predetermined order.

A further object of this invention is to provide an improved valve operating mechanism for use in an internal combustion engine of the type having an auxiliary combustion chamber which readily controls the opening and closing of the intake valve of such auxiliary combustion chamber to temporarily halt such operations even under engine braking conditions.

The foregoing and other objects of this invention are achieved according to at least one aspect thereof through the provision of an internal combustion engine comprising a piston slidably received in a cylinder for rotating an output shaft of the engine, a main combustion chamber defined between the piston and a cylinder head for igniting and burning a supplied air-fuel mixture, an auxiliary combustion chamber communicating with the main combustion chamber through a passage, an ignition plug connected to an ignition energy source so that the end portion thereof is disposed in the auxiliary combustion chamber, and an inlet pipe communicating with the auxiliary combustion chamber which is opened and closed by an intake valve and provided with a fuel supply means, such as a carburetor or the like, for supplying an air-fuel mixture thereto. The engine further comprises an intake valve lifter having a piston member which is operatively connected to the intake valve of the auxiliary combustion chamber and a cylinder member which receives the piston member, forming therebetween a cylinder chamber, a fluid pressure supplying device driven in synchronism with the rotation of the engine for supplying a fluid pressure, and a fluid pressure supply passage for supplying the intake valve lifter with a fluid pressure which is generated by the fluid pressure supply device.

Thus, the opening and closing operation of the intake valve of the auxiliary combustion chamber is controlled by introducing the fluid pressure, which is generated by the fluid pressure supply device, in synchronism with the rotation of the engine, into the cylinder chamber of the intake valve lifter through the fluid pressure supply passage. Thus, the present invention is capable of controlling the opening and closing operations of the intake valves of the auxiliary combustion chamber by means of a hydraulic system comprising a fluid pressure supplying device, a fluid pressure supply passage and an intake valve lifter.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference numerals designate like or corresponding parts throughout the several views, and wherein:

FIG. 12 is a vertical side view, also showing partly in cross-section, an essential part of the internal combustion engine of the fifth embodiment;

FIGS. 13 through 21 are sectional views, respectively showing essential parts of the fluid pressure supply device in the internal combustion engine according to the fifth embodiment of the invention.

DETAILED DESCRIPTION OF THE PREFERRED EMBODIMENTS

Figure 1:
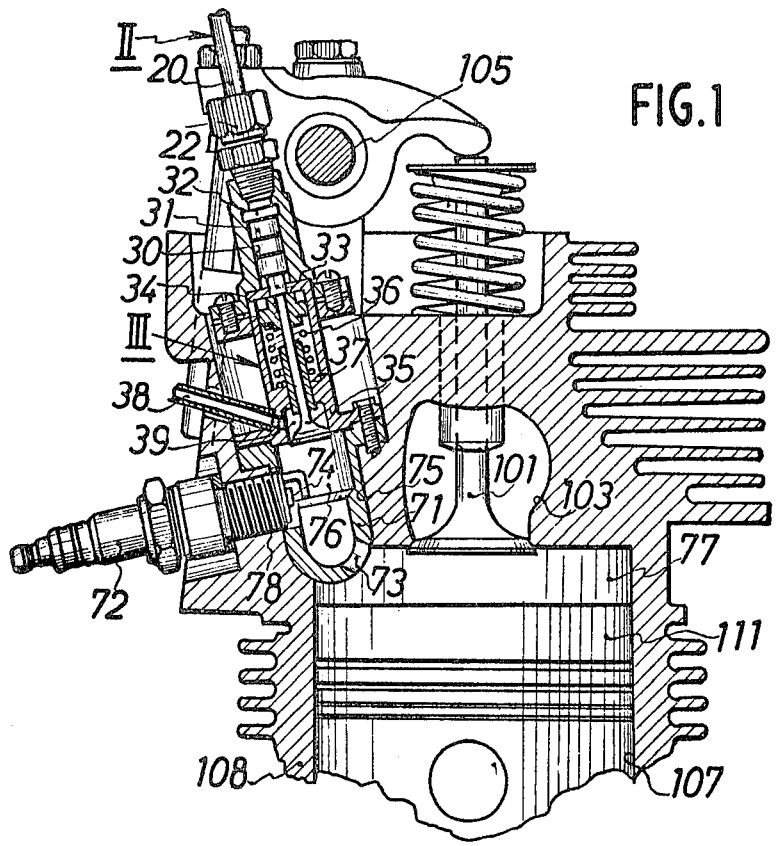
FIG. 1 is a cross-sectional view of a vertically opposed two cylinder, air-cooled engine in which the present invention is applied, and specifically showing the main and auxiliary combustion chambers of an engine cylinder with the fluid pressure supply passage of the hydraulic valve operating system of the invention being connected to the intake valve lifter of the auxiliary combustion chamber.
Figure 2:
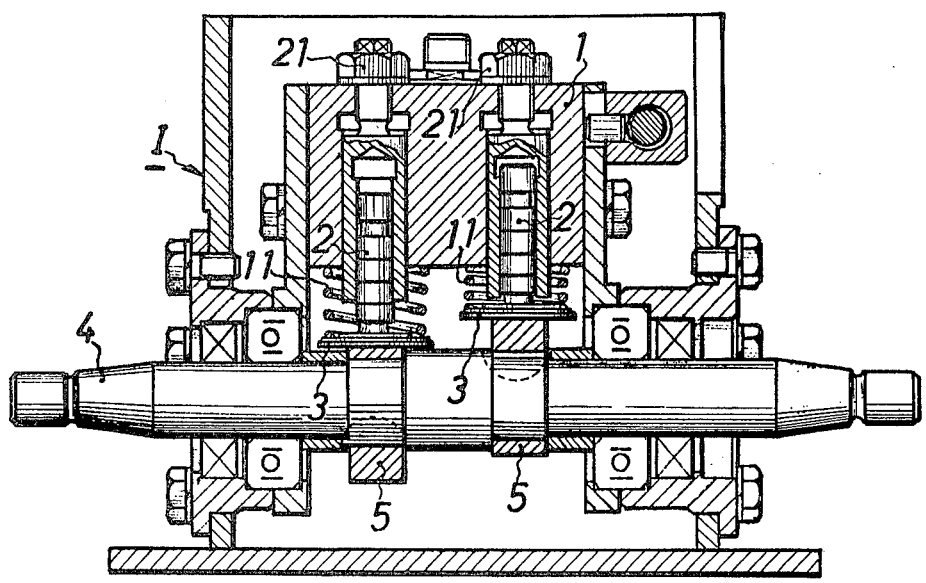
FIG. 2 is a view, partly in cross-section, of the fluid pressure supply device of the hydraulic valve operating system of this invention which is operative to control the intake valve lifter shown in FIG. 1.
Figure 3:
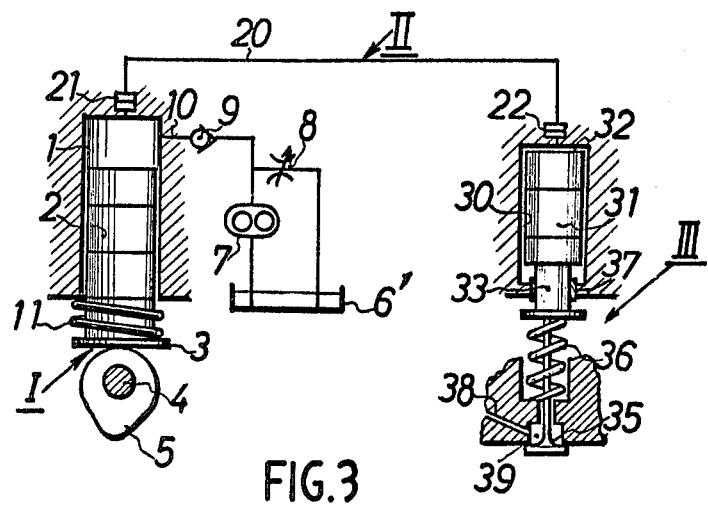
FIG. 3 is a schematic view of the hydraulic valve operating system as embodied in FIGS. 1 and 2 and showing in schematic form the relative operation of the fluid pressure supply device, the intake valve lifter of the auxiliary combustion chamber and the connecting supply passage.

Referring now to the drawings and more particularly to FIGS. 1–3 thereof, a first embodiment of the present invention being applied to a vertically opposed two-cylinder air-cooled engine is characterized in that the opening and closing operations of the intake valves of the auxiliary combustion chamber are controlled by a hydraulic valve operating system which generally comprises a fluid pressure supply device I, a fluid pressure supply passage II and an intake valve lifter III. While the following description is generally directed to only one of the two cylinders of the engine for the convenience of explanation, it should be understood that it is also applicable to the other cylinder.

The fluid pressure supply device I includes, as shown in FIGS. 2 and 3, a cylindrical housing member 1 formed with a pair of cylindrical bores in which are received a pair of piston members 2, each having at one end thereof a flange 3, and a compression spring 11 interposed between each of the flanges 3 of pistons 2 and one end of the cylindrical housing member 1 for constantly urging the piston members 2 to move out of the respective bores of the cylindrical housing member 1. The flanges 3 of the piston members 2 are held in abutting engagement with respective cams 5 of a predetermined configuration, which are fixedly mounted on a rotatable shaft 4 which is driven by the camshaft of the internal combustion engine through suitable mechanical power transmitting means such as a gear train, a chain drive or the like. Each cam 5, at its lobe portion, pushes its respective piston member 2 in its axial direction against the action of the spring member 11, through the flange 3, as a rotating member revolving in synchronism with the rotation of the engine. In this embodiment, the two cam members are mounted on the rotating shaft 4 with the lobe portions thereof having a phase difference of 180°. Therefore, as the engine rotates, the piston members 2 perform a reciprocating motion within the cylindrical housing member 1.

One end of a conduit 10 opens into the cylindrical housing member 1 through its side wall to provide communication between the respective bores of each of the pistons 2 and an oil reservoir 6', such as an oil pan in this embodiment, through a check valve 9 and a pump 7. Another fluid passage opens between the check valve 9 and the pump 7 and connects to the oil reservoir 6' through a pressure regulator valve 8. Therefore, the operating fluid within the cylindrical member 1 and the fluid passages is circulated in the system as the piston members 2 are reciprocated within the cylindrical housing member 1. A small amount of operating fluid which leaks out through a clearance between the cylindrical housing member 1 and the piston members 2 is compensated for by means of the pump 7 which thereby supplements the operating fluid controlled to a predetermined pressure level by the pressure regulator valve 8 through the check valve 9.

The intake valve lifter III will now be described with reference being made to FIGS. 1 and 3, wherein there is shown for each cylinder, a bore 75 being formed obliquely from above in a cylinder head, which has outer cooling fins, to open into the upper side of the main combustion chamber 77. The bore 75 has a stepped portion, or an annular shoulder, to divide the bore into two bore portions of different diameters. The bore portion of a smaller diameter is provided contiguously to the main combustion chamber 77. The smaller diameter bore portion of the bore 75 receives a derby hat-shaped hollow member 71 to form an auxiliary combustion chamber contiguous with the main combustion chamber. The hollow member 71 has an annular flange at one end which is held in abutting engagement with the annular shoulder of the bore 75 and is fixedly secured to the cylinder head, as by bolt means, together with a flange portion at the lower end of a cylindrical member 34, which will be described later in greater detail. In the side wall of the hollow member 71, a through aperture is provided, having a diameter slightly greater than the diameter of the sparking end of an ignition plug, which will also be discussed later. The hollow member 71 further has at its fore end a passage 73 of a predetermined sectional area and inclination relative to the main combustion chamber. The passage 73 intercommunicates between the auxiliary combustion chamber 76, which is formed within the hollow member 71, and the main combustion chamber 77. The afore-mentioned cylinder head has a second internally threaded bore 78 which is directed toward the axis of the smaller diameter portion of the bore 75 and opens at the through-aperture in the side wall of the hollow member 71. An ignition plug 72, which is connected to a distributor, not shown, is threaded into the second bore 78, with the sparking end 74 thereof being disposed in the auxiliary combustion chamber 76.

The cylindrical member 34 has flanges at its opposite ends and a stepped portion, or an annular shoulder at a position nearer the lower end, dividing the interior of this member into two chambers. The flange at the lower end of the cylindrical member 34 is fixedly secured to the cylinder head through the flange of the upper end of the hollow member 71, as previously indicated. A guide member 37 is concentrically fitted in the stepped portion of the cylindrical member 34 and is slidably inserted therethrough by a stem portion of an intake valve 35. The intake valve 35 is airtightly abutted against a valve seat which is provided on the inner periphery of the flange at the lower end of the cylindrical member 34. A lower chamber 39 is formed by the intake valve 35 and the side wall and stepped wall portion of the cylindrical member 34. The cylindrical member 34 has in its side wall an aperture for receiving a pipe 38 of a small diameter which communicates at one end with the lower chamber 39 and at the other end with a carburetor, not shown, for the auxiliary combustion chamber. A spring member 36 is disposed in the upper chamber which is defined by the side wall and stepped portion of the cylindrical member 34. The upper end of the spring member 36 is provided with a spring seat which is secured to the upper end of the stem portion of the intake valve 35, and the spring member 36 thus normally urges the spring seat to press the intake valve 35 against the valve seat of the cylindrical member 34.

A hollow cylinder 30 has a flange at its lower end which is fixedly secured to the flange portion of the upper end of the cylindrical member 34 by bolt means. A piston 31 is slidably and liquid-tightly arranged in the cylinder 30 and at the lower end of the piston 31, a rod member 33 is fixedly provided with the end thereof being abutted against a spring seat provided on the cylindrical member 34. The opposite end of the piston 31 which is remote from the rod member 33 defines a cylinder chamber 32 together with the side walls of the cylinder 30.

The fluid pressure supply passage II, as described, is constituted by a steel pipe 20 which has a length of 500 mm. and an outer diameter to inner diameter ratio of 5:3 is connected at its opposite ends to the fluid pressure supply device I and to the respective cylinder chamber of the intake valve lifter III by metal fittings 21 and 22, respectively, for supplying the intake valve lifter III with the fluid pressure which is generated by the fluid pressure supply device I.

The operation and the resultant effects as attained by this embodiment of the internal combustion engine of the present invention are as follows:

Assuming that the engine is rotating at a constant speed, the rotary shaft 4 of the fluid pressure supply device I is rotated at half the engine speed and the cams 5 compressingly drive the corresponding pistons 2 of the respective cylinders 1 at a phase lag of 180° in the axial direction of the cylinders 1. As the rotary shaft 4 rotates, each piston member 2 is reciprocated repeatedly, and compresses upwardly the operating fluid in the cylinder member 1 to supply the generated fluid pressure to the cylinder chamber 32 of the intake valve lifter III through the steel pipe 20 of the fluid pressure supply passage II. The supplied fluid pressure presses the piston 31 to cause movement in the axial direction against the action of the spring member 36 to place the intake valve 35 in an "open position".

In the embodiment just described, the rotary shaft 4 is rotated with a predetermined phase difference relative to the rotation of the camshaft which drives the intake and exhaust valves of the main combustion chamber. The air-fuel mixture which is introduced into the auxiliary combustion chamber 76 while the intake valve 35 is in the "open state" is ignited and burned by the ignition plug 72, the burning flames thus bursting out in a desired timing into the main combustion chamber 77 through the communicating port or passage 73 to ignite and burn the compressed air-fuel mixture which has been introduced through the intake valve of the main combustion chamber.

In the present embodiment, the hydraulic valve operating mechanism is provided independently of the valve operating mechanism for the intake and exhaust valves of the main combustion chamber, so that it is possible to control the opening period of the intake valves of the auxiliary combustion chamber in arbitrary phases without being restricted by the valve operating mechanism of the main combustion chamber. Since the valve operating mechanism can thus be simplified in construction, the auxiliary combustion chambers 76 can be mounted in a suitable position. The present embodiment can also increase the practicability of the engine by connecting the replenishing pump means 7 and hydraulic conduit 10 of the fluid pressure supply device I to the lubrication system of the engine to use the engine oil as the operating fluid.

According to a second embodiment of the invention, the cylinder member of the intake valve lifter 35 of the first embodiment is further provided with an opening in its side wall connected with an oil reservoir and in a position corresponding to a predetermined length of the piston stroke. In this second embodiment, a predetermined amount of pressurized fluid is circulated every time the piston is reciprocated. Should air or bubbles be intermixed or generated in the operating fluid, they are discharged out of the fluid circuit through this opening to prevent operation failures or other troubles with the apparatus.

Figure 4:
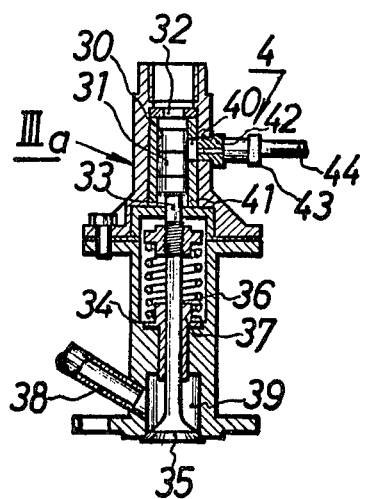
FIG. 4 is a view, partly in cross-section, of the intake valve lifter, according to a second embodiment of the present invention.

The second embodiment will now be described more particularly with reference to FIGS. 4 and 5, wherein the internal combustion engine is characterized in that a fluid pressure releasing means 4 is added to the intake valve lifter III of the internal combustion engine of the first embodiment shown in FIGS. 1–3.

The intake valve lifter IIIa has an opening 40 in a predetermined position of the side wall of the cylinder 30. More particularly, between the piston 31 and the wall of cylinder 30, a hollow cylindrical member 41 is interposed, so that the piston 31 slides reciprocatingly in the axial direction along the inner periphery of the intermediate cylindrical member 41. The intermediate cylindrical member 41 has an opening 40 bored through its side wall, at a position which falls within the range of displacement of the upper end of the piston 31 when it is stroked within the cylindrical member 41. That is to say, the opening 40 is normally closed when the piston 31 is not being stroked, and is opened to introduce the operating fluid only when the piston 31 is stroked, or moved downwardly to open the intake valve 35. The cylinder 30 has a restricting member 42 of a predetermined diameter threaded into the side wall thereof in registration with the opening 40 of the intermediate cylindrical member 41. The throttle member 42 is connected with a copper pipe 44 by means of a connecting member 43 which provides communication with an oil reservoir, or an oil pan.

In a fluid pressure supply device of the plunger type, the operating fluid is reciprocated within closed conduits, so that in some cases air bubbles are generated and intermingled in the operating fluid during long use to interfere with normal opening and closing operations of the intake valve. The internal combustion engine of the second embodiment, which has the above-described construction, shows the following operations and resultant effects, in addition to those obtained in the engine of the first embodiment. Since the cylinder chamber 32 has the fluid pressure releasing means 4, which becomes conductive when the piston 31 is stroked to a predetermined position for sending out a predetermined amount of operating fluid on each compression stroke of the piston 31, air bubbles which might be entrained or generated in the operating fluid, can be ejected from the operating fluid to maintain normal operation of the intake valve 35 of the auxiliary combustion chamber 76.

In this instance, the operating fluid is circulated within the system which is constituted by the oil reservoir and the fluid conduits, maintaining the operating fluid in each of the conduits in a fresh state and at the same time preventing deterioration of the operating fluid.

Figure 5:
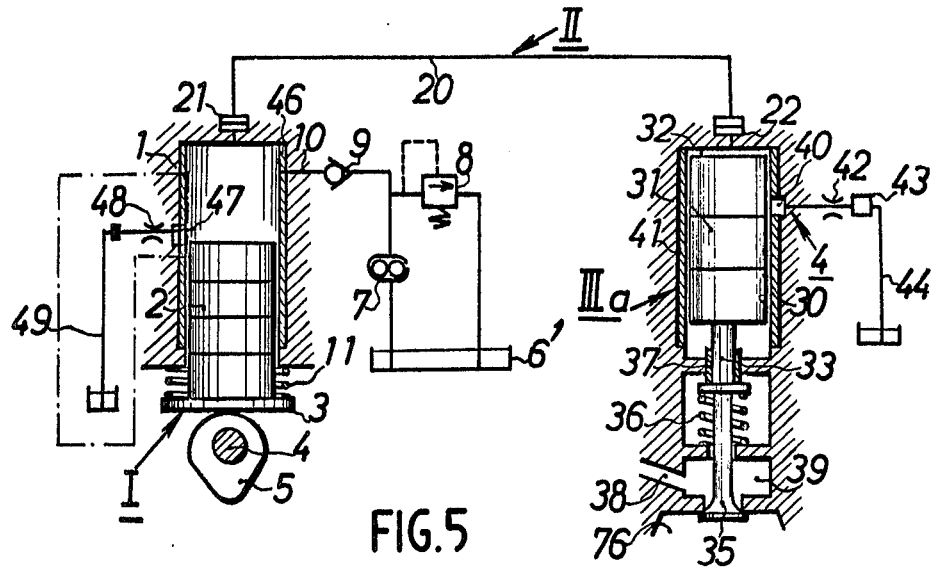
FIG. 5 is a schematic view illustrating the hydraulic valve operating system according to the embodiment shown in FIG. 4, but further showing a modified form of the fluid pressure supply device.

As a modification of the internal combustion engine of the second embodiment, a similar fluid pressure releasing means 45 may be added to the fluid pressure supply device I of the second embodiment, whereby a hollow intermediate cylindrical member 46 is interposed between the cylinder member 1 and the piston member 2 of the fluid pressure supply device I, as shown in FIG. 5. The interposed cylindrical member 46 has an opening 47 at a predetermined position of its side wall. More particularly, the opening 47 is provided to open only when the piston member 2, which is reciprocatingly driven from the cam 5 on the rotary shaft 4, comes into its lowermost stroke position. The opening 47 is closed during the upstroke of the piston member 2 from its lowermost to its uppermost position. The cylinder member 1 has threaded in its side wall a restricted passage 48 of a predetermined diameter to be connected with the opening 47 of the interposed cylindrical member 46. The restricted passage 48 is connected to a steel pipe 49 by means of suitable connecting means to be communicated with an oil pan or reservoir. This modified internal combustion engine shows the following operations and resultant effects, in addition to those attained by the internal combustion engine of the second embodiment. Even if, for some reason, in the fluid pressure supply passage II and in the respective cylinder chambers of the fluid pressure supply device Ia and intake valve lifter IIIa, the pressures are increased over a predetermined value, so as to cause disturbances in the pressure waveform, since the operating fluid within the cylinder chamber of the fluid pressure supply device Ia is allowed to escape to the oil pan through the opening 47, the passage 48 and the pipe 49 when the piston member 2 is not being stroked, a pressure of a correct waveform generated by the reciprocating movement of the piston member 2 which is driven by the cam 5 can be constantly maintained within the system.

In the modification under discussion, it is possible to change the pulse width of the pressure waveform or the valve opening period of the intake valve lifter IIIa, simply by moving the interposed cylinder member 46 of the fluid pressure supply device Ia up or down in the axial direction to change the position of the throttled passage 48 relative to the stroke of the piston member 2.

Furthermore, in the present modification, by changing the phase of the cylinder member 1 of the fluid pressure supply device Ia relative to the camshaft 4 or, in other words, by fixing the cylinder member 1 in a position displaced through a predetermined angle about the camshaft 4, the rising time of the pulses in the pressure waveform, or the valve opening period of the intake valve lifter IIIa, may be varied as desired.

In another form, the hydraulic circuit of the present invention which controls the opening and closing operations of the intake valve of the auxiliary combustion chamber has another hydraulic circuit provided therewith, which is operatively responsive to the detection of a particular operating condition of the engine to place an unloading or venting valve in a conductive state to allow the fluid pressure which is generated by the fluid pressure supply device in synchronism with the rotation of the engine to escape to the oil reservoir through the unloading valve, thereby temporarily halting the control of the opening and closing operation of the intake valve by the intake valve lifter.

Figure 6:
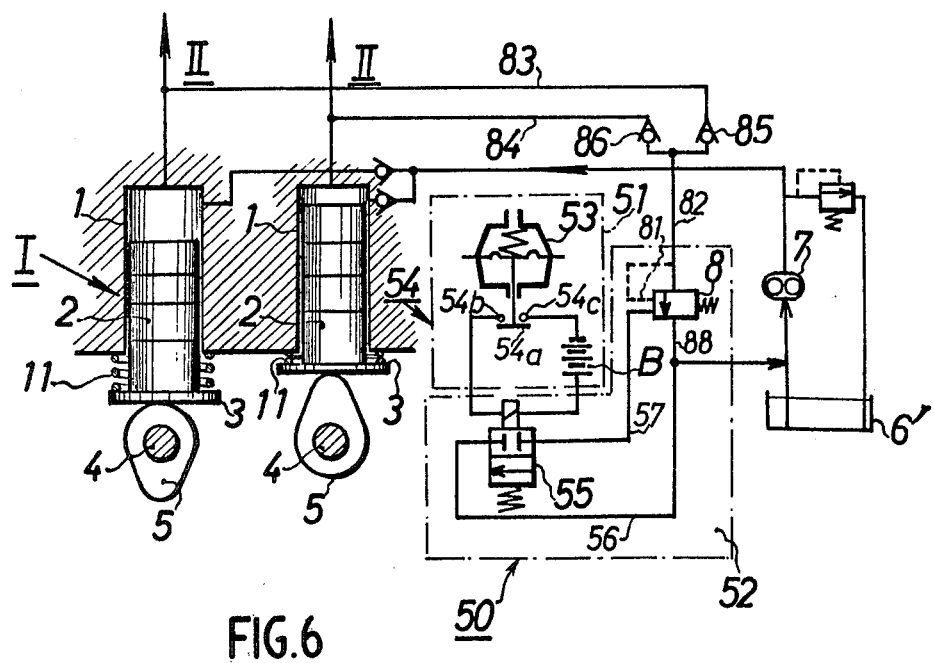
FIG. 6 is a schematic view of a third embodiment of the invention utilizing an additional hydraulic circuit having an unloading valve for letting pressurized fluid escape to a reservoir to temporarily halt operation of the intake valve under given engine conditions.

Thus, as indicated hereinbefore, in order to improve the engine exhaust, it is often necessary to prevent feeding of fuel to the auxiliary combustion chamber under particular operating conditions of the engine. As a typical example, under engine braking conditions, where the engine is acting as a brake, the hydraulic drive of the intake valve of the auxiliary combustion chamber and the fuel supply to the auxiliary combustion chamber should be temporarily stopped. Accordingly, in this embodiment of the invention, in order to attain the above-mentioned object, an internal combustion engine constructed as in the case of the first embodiment is further provided with an unloading valve 50 and, as shown in FIG. 6, the unloading valve 50 has a detector 51, which detects the operating conditions of the vehicle, or the engine, and generates a signal for stopping the operation of the intake valve of the auxiliary combustion chamber, and a cut-off valve 52 which, upon receipt of the signal from the detector 51, cuts off the fluid pressure which is generated by the fluid pressure supply device I.

The detector 51 comprises a diaphragm type actuator 53, a switch element 54, and a DC power source B in the form of a battery, such as the engine battery. The diaphragm type actuator 53 is divided into two chambers on opposite sides of the diaphragm, one being connected to the intake manifold of the engine by means of a rubber pipe and having a spring of a predetermined spring constant interposed therein, while the other is open to the atmosphere. Further, the diaphragm has secured thereto a rod member which extends from the other of the chambers and at its opposite end has a movable contact 54a. In this instance, the spring constant of the spring member is determined such that, under the normal operating conditions, except when the engine is in a braking condition, the combined force of the vacuum pressure from the intake manifold of the engine and the spring force of the spring member overcomes the atmospheric pressure introduced in the other chamber, and such that on the contrary, under engine braking conditions, the atmospheric pressure in the other chamber overcomes the above combined force to compressively deform the diaphragm upwardly. A contact 54b is connected to a positive terminal of the DC power source B, through a solenoid coil of an electromagnetic on-off valve 55, which will be described later, while another contact 54c is connected to the negative terminal of the DC power source B. Therefore, under engine braking conditions, the diaphragm is deformed upwardly, as seen in FIG. 6, holding the movable contact 54a of the switch element 54 in contacting engagement with the stationary contacts 54b and 54c to energize the solenoid of the electromagnetic valve 55.

The cut-off valve 52 includes the electromagnetic valve 55 which has one port, communicated with a passage 88 between the pressure regulator valve 8 of the pressure supply device I, connected to fluid pressure supply passage through a check valve 85, and the oil reservoir 6' through a passage 56, while the other port of the electromagnetic on-off valve 55 is communicated with a vent pressure induction passage 81 of the pressure regulator valve 8 through a passage 57. Therefore, when the electromagnetic on-off valve 55 is in the position shown in FIG. 6, that is, under normal vehicle driving conditions, the vent pressure is supplied to the passage 57, but not to the other passage 56, since the passage 57 is cut off from the passage 56 by the on-off valve 55.

The other passage 82 of the pressure regulator valve 8 is discharged into two branch passages 83 and 84, which are provided with check valves 85 and 86, respectively, the branch passages 83 and 84 being fluidly communicated with the respective fluid pressure supply passages II.

Thus, when the fluid pressure in one of the fluid pressure supply devices I rises for some reason extraordinarily or beyond a predetermined pressure level of the pressure regulator valve 8, the abnormal pressure is allowed to escape to the oil reservoir 6' through the passage 82, pressure regulator valve 8, and passage 88, without imposing adverse effects on the other one of the fluid pressure supply devices I.

The internal combustion engine of this third embodiment of the invention operates in a manner similar to the engine of the first embodiment. Under normal running conditions of the vehicle, the pressure supplied from the intake manifold is relatively close to the atmospheric pressure level, so that the diaphragm member of the diaphragm actuator 53 is deformed downwardly by the combined action of the supplied pressure and the spring force, as shown in FIG. 6, to disengage the movable contact 54a of the switch element 54 from the stationary contacts 54b and 54c. In this instance, as the electromagnetic on-off valve 55 is still in the cut-off position, the fluid pressure, which is supplied by the fluid pressure supply device I, is applied without being allowed to escape, to effect correct control of the opening and closing operation of the intake valve of the auxiliary combustion chamber.

On the other hand, under engine braking conditions, the pressure of the intake manifold is developed to a high level so that the diaphragm member of the actuator 53 is deformed upwardly, as seen in FIG. 6, by the atmospheric pressure against the action of the spring force, bringing the movable contact 54a of the switch element 54 into contacting engagement with the stationary contacts 54b and 54c, whereupon the solenoid coil of the electromagnetic on-off valve 55 is energized by the voltage from the DC source B through the switch element 54 to push the on-off valve upwardly, as seen in the drawing, from the cut-off position to the conductive position, against the action of the spring. Thus, the fluid pressure which is generated by the reciprocating action of piston member 2 of the fluid pressure supply device I in synchronism with the engine rotation is allowed to escape to the oil reservoir 6' through the passage 83 and check valve 85, or through the passage 84 and check valve 86, and then through the passage 82, vent pressure induction passage 81, passage 57, electromagnetic on-off valve 55, and passages 56 and 88. Therefore, a fluid pressure for driving the intake valve of the auxiliary combustion chamber is not generated. The intake valve of the auxiliary combustion engine can thus be maintained in the closed state during the engine braking conditions, such that the fuel does not flow into the auxiliary combustion chamber, and the amount of unburned components of the engine exhaust gas during such engine braking conditions can thus be reduced by a considerable degree, as can be the fuel costs.

The foregoing description refers to the engine braking conditions as an example of the particular operating condition of the engine. However, the third embodiment of the invention is not limited thereto, but presumably may be applied to other operating conditions, such as, for example, sudden acceleration and sudden deceleration conditions.

An important feature of the present invention resides in the fact that it is extremely easy to stop the drive of the intake valve of the auxiliary combustion chamber under engine braking conditions, since the intake valve of the auxiliary combustion chamber is driven hydraulically and independently of the mechanical valve operating mechanism which drives the intake and exhaust valves of the main combustion chamber.

A fourth embodiment of an internal combustion engine formed in accordance with this invention is hereafter explained with reference being made to FIG. 7, and particularly emphasizing the differences relative to the internal combustion engine of the third embodiment, already described.

The internal combustion engine of this fourth embodiment is different from the others in that the invention is applied to a four-cylinder, in-line type internal combustion engine. In order to control the opening and closing operations of the intake valves of the auxiliary combustion chambers of the respective engine cylinders in synchronism with the rotation of the engine, the hydraulic valve operating system further incorporates a rotary distributor valve which is driven from a shaft which is rotatable in synchronism with the camshaft of the engine, and a trochoidal pump serving as a supplying pump, and also a mechanical on-off valve, as the cut-off valve, instead of the afore-mentioned electromagnetic on-off valve, is employed.

Though the foregoing embodiments employ a cam-driven plunger type pump as the fluid pressure supply device I, the internal combustion engine of the fourth embodiment uses a trochoidal pump 91 driven in synchronism with the camshaft and supplied at its suction port with the fluid which is discharged from an engine lubricating pump, through an oil filter, not shown, and a check valve 96. The delivery end of the trochoidal pump 91 is connected to a feeding pressure regulator valve 95 and the outlet port of the valve is connected to a passage of the suction side of the trochoidal pump 91. The rotary distributor valve 6 is composed of a cylinder 61 which has an annular feeding groove 63, distributing ports 64 and an annular discharging groove 67 in predetermined positions and of a distributing shaft 62 which is fit in the cylinder 61 and rotatingly driven from a shaft which is in turn driven in synchronism with the camshaft in the same manner as the trochoidal pump 91. The annular feeding groove 63 of the cylinder 61 is connected to the discharging end of the trochoidal pump 91 through a passage 98, while each distributing port 64 is fluidly communicated with an intake valve lifter III, not shown, of the respective engine cylinder through the steel pipe 20 of the fluid pressure supply passage II.

The distributing shaft 62 is provided with a radially extending feeding passage 69 in a position within the boundary of the annular feeding groove 63, an inner cavity 68 which extends axially and is in communication with the feeding passage 69, a distributing passage 66 extending from the outer wall surface of the shaft 62 to the inner cavity 68 in such a position as to communicate with the distributing port 64 and discharging grooves 65 which are formed in the axial direction in the outer wall surface of the shaft 62. As the distributing shaft 62 is rotatingly driven in synchronism with the camshaft, the pressurized operating fluid from the trochoidal pump is distributed through the passage 98, the annular feeding groove 63, the feeding passage 69 and the inner cavity 68 to the intake valve lifters III of the respective engine cylinders in a correct order and with a phase lag of 90°, while the distributing passage 66 is in communication with the distributing ports 64 through 90°.

When the distributing port 64 is switched from the communication with the distributing passage 66 into communication with the discharging groove 65, the supplied operating fluid is discharged to the oil reservoir 6' through the discharging groove 65, annular discharging groove 67 and back pressure regulating orifice 97, by the action of the return spring of the intake valve lifter III. Therefore, the pressure within the steel pipe 20 of the fluid pressure supply passage II is maintained at a level the same as the back pressure generated by the back pressure regulating orifice 97, and the distributing port 64 is held in communication with the discharging groove 65 through 270°.

The unloading valve 5 for detecting the engine braking conditions and cutting the fuel supply to the auxiliary combustion chambers comprises a diaphragm type actuator 93, which is similar to but slightly larger in capacity than the diaphragm type actuator 53 of the detector 51 in the third embodiment, and a mechanical on-off valve 94, which is switched between two positions directly by use of the displacement of the diaphragm member of the actuator 93. The inlet and outlet ports of the mechanical on-off valve 94 are fluidly connected with a passage 98 between the distributor valve 6 and the trochoidal pump 91 and with a passage 99 between the distributor valve 6 and the back pressure regulating orifice 97, respectively, through a passage 92.

In the internal combustion engine of the fourth embodiment, since the fluid pressure generated by the trochoidal pump 91, which is driven according to the rotation of the engine, is distributed to the respective cylinders in a predetermined order by the operation of the distributor valve 6, the opening and closing operations of the intake valves of the auxiliary combustion chambers of the respective cylinders can be controlled in a predetermined timing and predetermined order to ensure optimum combustion.

Figure 7:
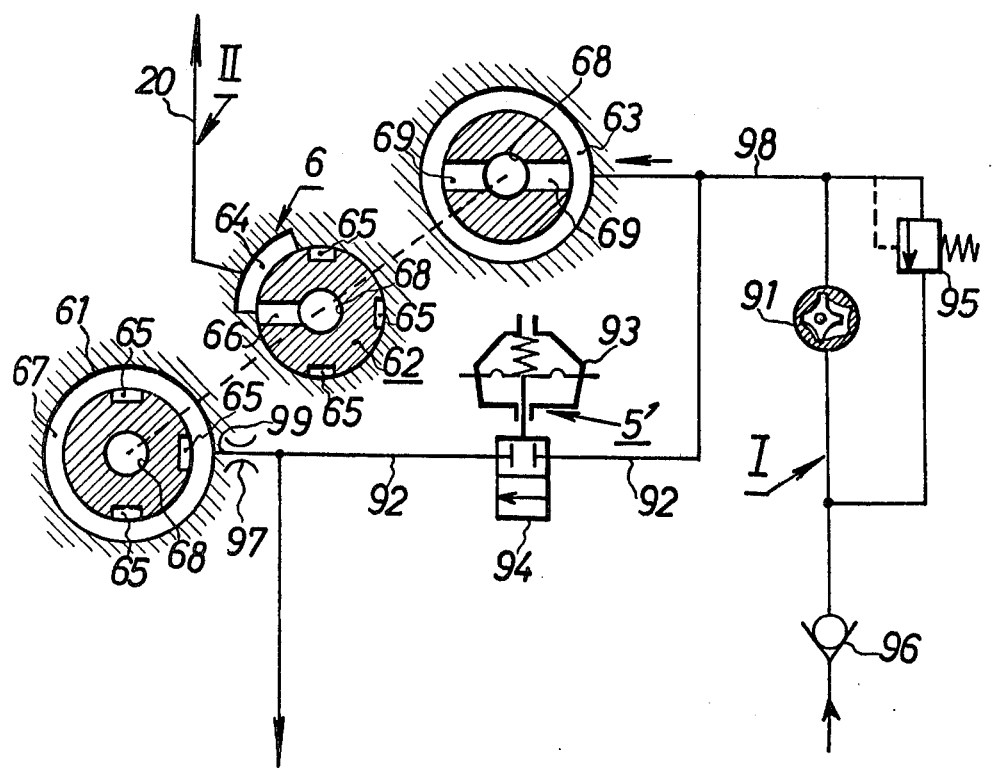
FIG. 7 is a schematic view of a fourth embodiment of the invention having a rotary distributor valve.

If the engine is in an engine braking condition, the diaphragm type actuator 93 detects this condition immediately from the pressure developed in the intake manifold and pushes the diaphragm member upwardly, as seen in FIG. 7, to place the mechanical on-off valve 94 in a conductive position, which is opposite to the position of FIG. 7. As a result, the passages 98 and 99 are short-circuited. The fluid pressure generated by the trochoidal pump 91 is thus allowed to escape to the oil reservoir 6 through the passages 98 and 92, on-off valve 94, passages 92 and 99 and back pressure regulating orifice 97, without supplying the fluid pressure to any one of the intake valve lifters III which control the opening and closing operations of the intake valves of the respective auxiliary combustion chambers. Thus, similarly to the internal combustion engine of the third embodiment, the intake valve of the auxiliary combustion chamber is maintained in the closed state during engine braking conditions to prevent the fuel from flowing into the main combustion chamber from the auxiliary combustion chamber, contributing to improve exhaust characteristics under engine braking conditions. Thus, the engine of the fourth embodiment has the great advantage that the valves of the auxiliary combustion chambers can be driven in a far simplified and easier manner, as compared with the mechanical type valve operating mechanism.

Now, an internal combustion engine, which constitutes the fifth embodiment of the invention, will be described, with reference being made to FIGS. 8 through 21. The engine of this fifth embodiment is a four-cylinder, in-line type water-cooled internal combustion engine.

More particularly, the internal combustion engine of the fifth embodiment comprises pistons which are slidably received in the respective cylinders for rotating an output shaft of the engine, main combustion chambers formed between the pistons and the respective cylinder heads for igniting and burning a supplied air-fuel mixture, auxiliary combustion chambers provided with a port for communication with said combustion chamber wherein a sparking end of an ignition plug connected with the energy source for ignition is disposed and an intake valve for opening and closing an inlet pipe which leads to the auxiliary combustion chamber, the inlet pipe including a fuel supplying device such as a carburetor or the like for supplying an air-fuel mixture to the auxiliary combustion chamber. This embodiment is further characterized by the provision of intake valve lifters each having a cylinder and a piston slidably fitted therein and operatively connected to the intake valve of the auxiliary combustion chamber, such cylinder and piston of the intake valve lifter forming therebetween a cylinder chamber, a fluid pressure supply device which is driven in synchronism with the rotation of the engine for supplying pressurized fluid, and a fluid pressure supply passage for supplying the intake valve lifter with the fluid pressure which is supplied by the fluid pressure supply device, whereby the fluid pressure generated by the fluid pressure supply device in synchronism with the rotation of the engine is introduced into the cylinder chamber of the intake valve lifter through the fluid pressure supply passage to push the piston, so as to control the opening and closing operations of the intake valve of the auxiliary combustion chamber.

The internal combustion engine of the fifth embodiment is further characterized in that the cylinder of the intake valve lifter is provided with an opening in a predetermined position of the side wall thereof so as to communicate the cylinder chamber with an oil reservoir when the piston is stroked over a predetermined distance for sending a predetermined amount of pressurized fluid out of the cylinder through the opening on each stroke of the piston, and that in addition to the fluid circuit for controlling the opening and closing operations of the intake valve of the auxiliary combustion chamber, a fluid circuit with an unloading valve which is operatively connected to a detecting means is provided for detecting particular operating conditions of the engine and for placing the unloading valve in a conductive state, upon detection of particular operating conditions, to allow the fluid pressure which is generated by the fluid pressure supply device to escape to the oil reservoir through the unloading valve.

The internal combustion engine of the fifth embodiment, which has the features as described above, will be explained hereafter in connection with one of the four cylinders of the engine for the simplicity of explanation.

Figure 8:
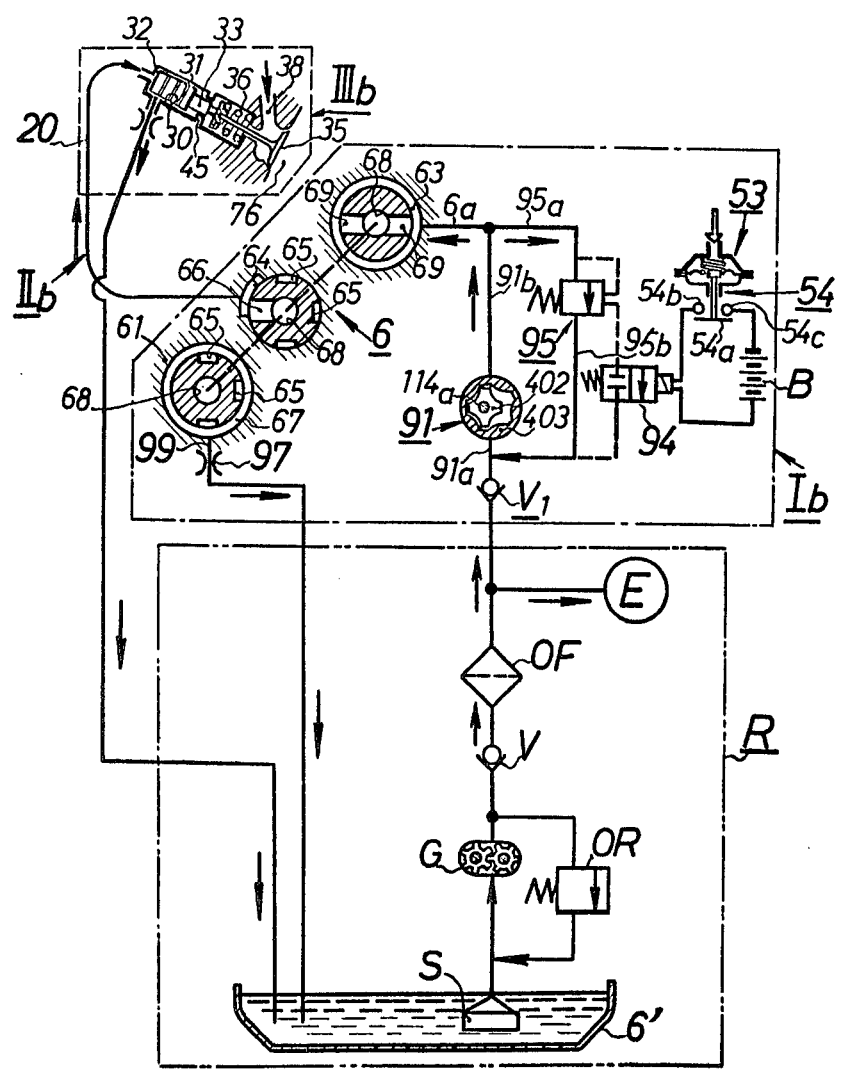
FIG. 8 is a diagram showing the fluid circuit system of an internal combustion engine constructed according to a fifth embodiment of the invention.
Figure 9:
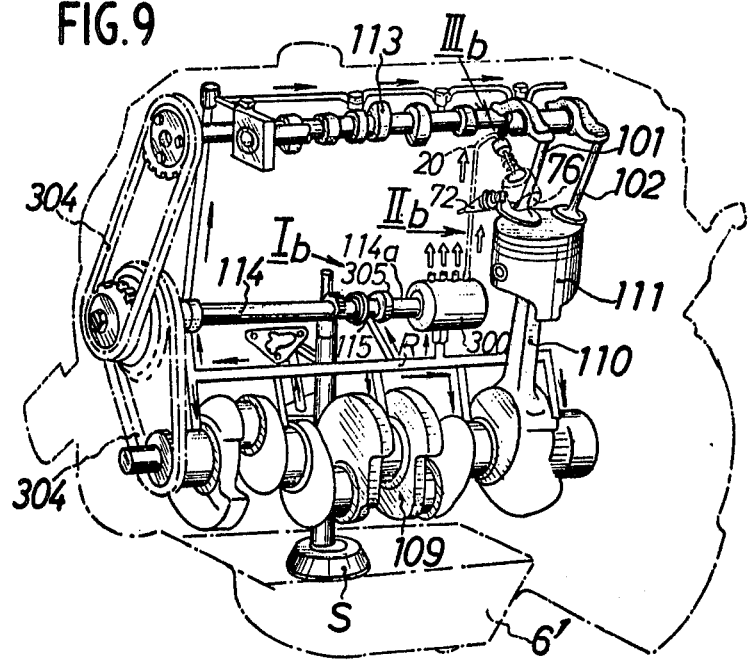
FIG. 9 is a diagrammatic perspective view of the embodiment shown in FIG. 8.

Referring now to the drawings, there is shown a fluid pressure supply device I*b*, a fluid pressure supply passage II*b* and an intake valve lifter III*b*, which are in fluid communication with a lubricant oil feed system R in an internal combustion engine, as shown particularly in FIGS. 8 and 9. The engine lubricant oil feed system R is of the pressure-feed type which feeds the lubricant oil under pressure to the various sliding parts of the engine by means of a gear pump G. The engine lubricant oil feed system R is composed of an oil reservoir 6', or an oil pan for holding a predetermined amount of lubricant oil of a predetermined viscosity, a strainer S immersed in the lubricant oil at the bottom of the oil reservoir 6' and having on its outer circumference a number of inlet passages for the lubricant oil, and the gear pump G having its oil inlet connected to the oil outlet of the strainer S and rotatingly driven from a driving shaft 114 which is connected to the crankshaft 109 by way of a timing chain 304 to make a ½ turn with every full revolution of the crankshaft for pressurizing the lubricant oil into a predetermined pressure. An oil filter OF is connected to the oil outlet of the gear pump G through a check valve V for removing particles of foreign matter such as worn metal, carbon, dust and the like, to feed clean oil to the various sliding parts of the engine, such as the crankshaft bearings and the valve operating mechanism, and a pressure regulator valve OR which has its inlet and outlet ports connected respectively to the oil outlets of the gear pump G and the strainer S for maintaining the oil pressure which is to be fed to the various sliding parts of the engine at a suitable value. The lubricant oil of the engine lubricant oil feed system R is used as the operating fluid for controlling the opening and closing operations of the intake valve in each auxiliary combustion chamber of the four cylinders, or more specifically, the fluid pressure supply device I*b* is connected at its upstream side to the oil outlet of the oil filter OF of the engine lubricant oil feed system R through a check valve $V_1$, as shown in FIG. 8.

The fluid pressure supply device I*b* is composed of a trochoidal pump 91, a pressure regulator valve 95, a cut-off valve 94, a rotary distributor valve 6 and a back pressure regulating orifice 97. The passage 91*a* leading to the oil inlet of the trochoidal pump 91 is in fluid communication with the outlet of the oil filter OF through a check valve $V_1$. The driving shaft 114*a* of the trochoidal pump 91 is integrally connected to the driving shaft 114 so that the inner and outer rotors 402 and 403 of the pump rotate a ½ turn with every full revolution of the crankshaft. Thus, the pump 91 is composed so as to pressurize the operating fluid discharged from the gear pump G up to a level sufficient for controlling the opening and closing operation of the intake valve 35. The oil outlet of the trochoidal pump 91 is in communication with the suction passages, or inlets, 95*a* and 6*a* of the pressure regulator valve 95 and the rotary distributor valve 6, respectively. The pressure regulator valve 95 serves to regulate the operating fluid to a predetermined pressure level suitable for closing the intake valve 35, the outlet or delivery passage 95*b* thereof being connected in fluid communication with the inlet or suction passage 91*a* of the trochoidal pump 91. Furthermore, the pressure regulator valve 95 is in fluid communication with the cut-off valve 94. The oil inlet of the cut-off valve 94 communicates with a second chamber 417 of the pressure regulator valve 95, which will be explained hereinafter. A valve member 511 of the cut-off valve 94, which will also be explained hereinbelow, is operatively connected to a detecting member 51, which is adapted to cut the fuel supply to the auxiliary combustion chamber 76 upon detection of engine braking or over-running conditions. In the engine braking conditions, the cut-off valve 94 operates to allow the operating fluid which is fed under pressure from the trochoidal pump 91 to escape to the oil reservoir 6', thereby to temporarily halt the control of the opening and closing operation of the intake valve 35. The rotary distributor valve 6 has a suction passage 6*a* connected in communication with the delivery passage 91*b* of the trochoidal pump 91, and the four distributing ports 64 are provided in communication with the intake valve lifters III*b* of the auxiliary combustion chambers of the respective engine cylinders, through the steel pipe 20 of the fluid pressure supply passage II*b*, with a phase difference of 90° from each other in the direction of rotation of the rotary distributor valve 6. The operating fluid is distributed from the distributing ports 64 to the respective intake valve lifters III*b* of the respective engine cylinders in an appropriate order and with a phase difference of 90°. The rotary shaft of the distributor valve 6, on its circumferential surface, has four discharging grooves 65 which are respectively held in communication with corresponding annular discharging grooves 67 while the operating fluid is not fed to the intake valve lifters IIIb of each engine cylinder from the distributor valve 6, that is to say, for a period of 270° rotation of the rotary distributor valve 6. The annular discharging grooves 67 are communicable with the oil reservoir 6' through a back pressure regulating orifice 97, and the rotary distributor valve 6 is constructed such that the pressure within the steel pipe 20 of the fluid pressure supply passage IIb may become the same level as the back pressure which is generated by the back pressure regulating orifice 97, when the four discharging grooves 65 and the annular discharging grooves 67 are in the conductive condition.

According to this embodiment, the fluid pressure supply device Ib distributes the operating fluid to the intake valve lifters IIIb, which are mounted on the main combustion chambers 77 of the respective engine cylinders, in a predetermined timing according to the engine rotation, at a predetermined pressure level and in a predetermined order, thereby to control independently the opening and closing operations of the intake valve of the auxiliary combustion chamber of each engine cylinder in predetermined timing and order, as shown in FIG. 8. In order to supply the operating fluid of a predetermined pressure level to each intake valve lifter IIIb, the fluid pressure supply device Ib includes, as shown in FIG. 8, a trochoidal pump 91 which is arranged to form one unit with the rotary distributor valve 6, the pressure regulator valve 95 and the back pressure regulating orifice 97 integrally.

Figure 10:
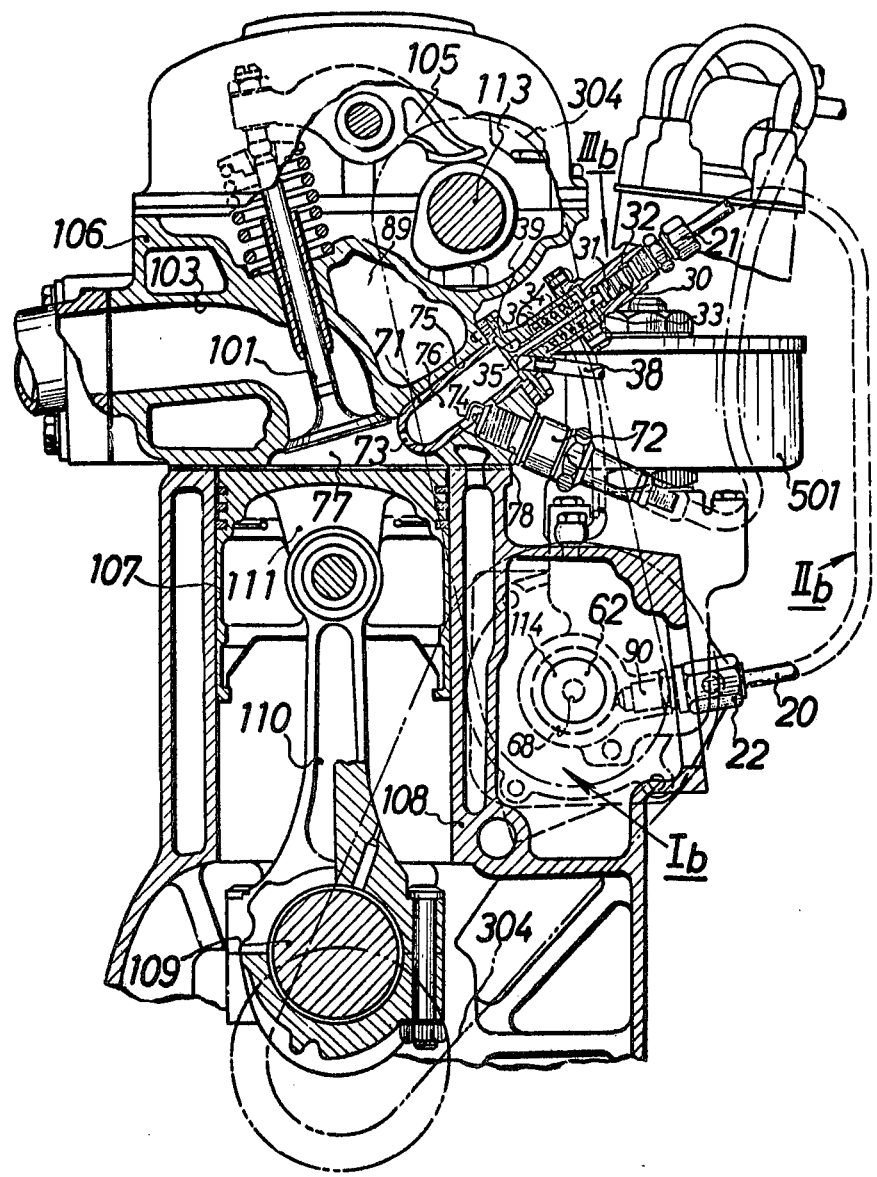
FIG. 10 is a transverse side view, partly in cross-section showing an essential part of the embodiment of FIGS. 8 and 9.
Figure 13:
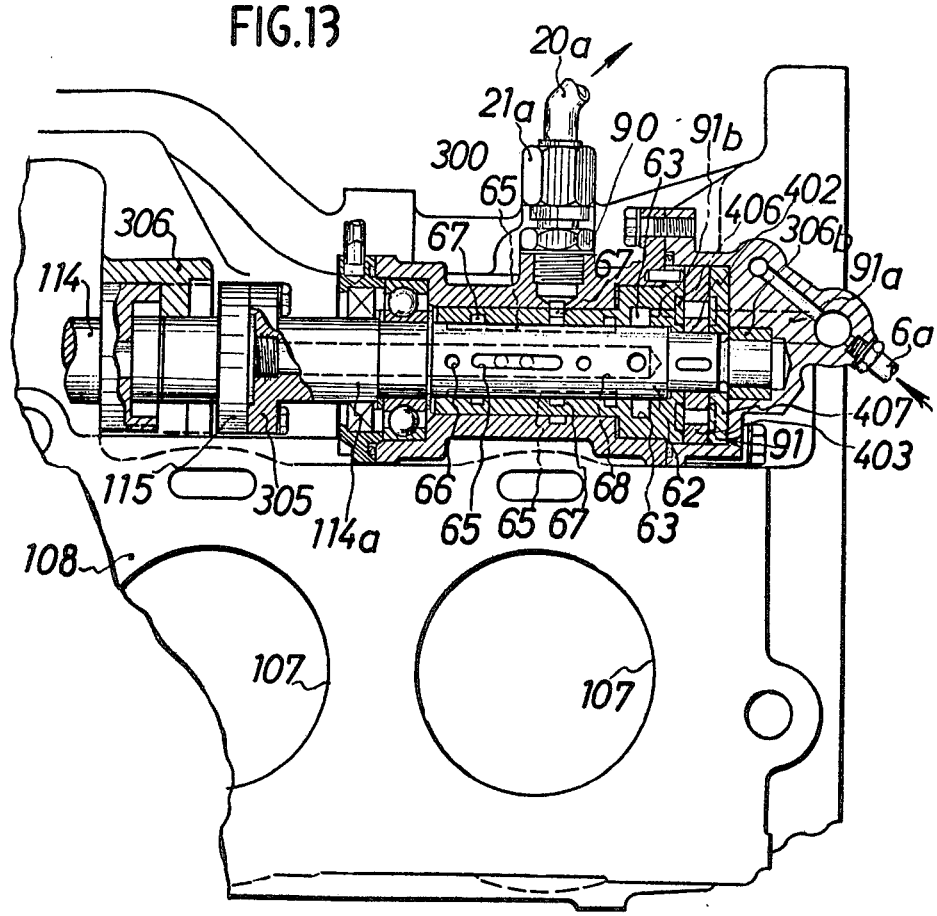

The trochoidal pump 91 serves to supply pressurized fluid to the intake valve lifter IIIb of each engine cylinder and has a suction passage 91a formed through the valve body 300, the upstream end of which is connected in communication with the engine lubricant oil feed system R, as shown in FIGS. 8 and 9. The trochoidal pump 91 has, as shown in FIGS. 8 through 13, an inner rotor 402 which is formed in a trochoidal curve and keyed to a driving shaft 114a for rotation therewith. The driving shaft 114a is rotatable integrally with the aforementioned driving shaft 114 of the gear pump G. The outer rotor 403 which meshes with the inner rotor 402 is disposed within the valve body 300 so as to rotate with the inner rotor 402. The trochoidal pump 91 has, at its opposite ends, a pair of valve plates 406 and 407, each having a pair of kidney-shaped ports 404 and 405, as shown in FIG. 18, and fixedly mounted within the valve body 300. One of the kidney-shaped ports serves as a suction or inlet port being connected in communication with the suction or inlet passage 91a, while the other kidney port serves as an outlet or delivery port, which is connected to communicate with an inner axial cavity 68 within the shaft 62 of the rotary distributor valve 6 and with an outlet or delivery passage 95a of the pressure regulator valve 95, which will be respectively discussed more particularly hereinbelow. The body of the trochoidal pump 91 is integrally secured to the cylinder block 108 by suitable fixing means, such as bolts or the like, as shown in FIGS. 12 and 13. The driving shaft 114a of the trochoidal pump 91 serves also as a distributing shaft 62 of the rotary distributor valve 6 which fits liquid-tightly in an inner bore of a distributing sleeve 62a within the valve body 300, and the driving shaft 114a is connected to the crankshaft 109 of the engine by means of a timing chain 304 to make a one-half turn with every full revolution of the crankshaft in a manner similar to the crankshaft 113 of the valve operating mechanism 105 of the main combustion chambers. More particularly, the internal combustion engine of the fifth embodiment is of the overhead valve type, as shown in FIGS. 9 and 10. The crankshaft 109 rotatingly drives the camshaft 113, which mechanically controls the opening and closing operations of the intake valve 101 and the exhaust valve 102 of the main combustion chamber 77 and also drives the driving shaft 114, which is rotatably supported on the cylinder block 108 to drive the gear pump G of the engine lubricant oil feed system R, respectively through the timing chains 304. The camshaft 113 and the driving shaft 114 make a one-half turn with every full revolution of the crankshaft 109. The driving shaft 114 is connected to and is integrally rotatable with the driving shaft 114a of the trochoidal pump 91, and the axis of the driving shaft 114a is disposed in substantially parallel relation to the axis of the crankshaft 109. The driving shaft 114a is provided at one end thereof with a flange 305, which is integrally connected to a flange 115 provided on the driving shaft 114 by a suitable coupling means, such as bolts or the like, and journalled in a bearing 306 of the cylinder block 108, while the other end of the driving shaft 114a is journalled in bearings 306a and 306b within the valve body 300.

Figure 14:
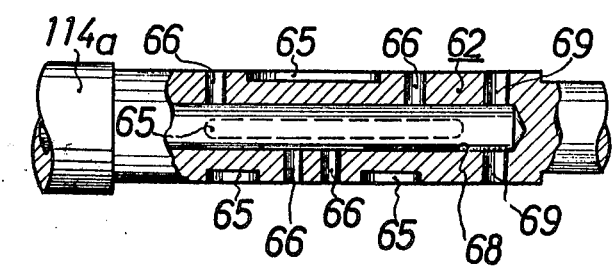

As shown in FIGS. 8, 13 and 15, the rotary distributor valve 6 is provided with a feed pressure regulator valve 95 and a back pressure regulating orifice 97 at one end and on the circumference of the distributing shaft 62, respectively. In order to control the opening and closing operations of the intake valves of the auxiliary combustion chambers 76 of the respective engine cylinders in a predetermined timing pattern, the rotary distributor valve 6 distributes the operating fluid, which is discharged from the trochoidal pump 91, to the intake valves of the respective auxiliary combustion chambers in a predetermined order, after pressurizing the fluid to a predetermined pressure level at the feed pressure regulator valve 95. As mentioned hereinbefore, the distributing shaft 62 of the rotary distributor valve 6 is formed commonly with the driving shaft 114a of the trochoidal pump 91 and fits in liquid-tight relation in a bore of a distributing sleeve 62a, which is disposed within and integrally secured to the valve body 300. Furthermore, the rotary distributor valve 6 is provided with a bottom-closed axial inner cavity 68 in an axial center portion of the distributing shaft 62 and a feeding passage 69 which extends radially through the distributing shaft 62, so as to communicate with the inner cavity 68, as shown in FIGS. 13 and 14. The distributing sleeve 62a is provided with an annular feeding groove 63 on its inner wall surface being in opposed relation to the feeding passage 69 of the rotary distributor valve 6 for fluid communication therewith. The upstream side of the feeding groove 63 is in communication with the kidney-shaped outlet port 404 of the valve plate 406, which is provided at the end of the distributing sleeve 62a.

The rotary distributor valve 6 is provided with four distributing passages 66 between the two ends of the distributing shaft 62. The four distributing passages 66 extend radially through the wall of the shaft 62, from the axial cavity to the outer peripheral surface thereof, as shown in FIG. 14. Two passages 66 disposed at end portions of shaft 62 are provided with phase difference of 180° from the two passages disposed at inner portions so as to correspond to the four intake valves 35 of the engine cylinders. The distributing sleeve 62a which fits in liquid-tight relation over the distributing shaft 62, is provided with four distributing ports 64 which communicate with the four distributing passages 66 of the shaft 62 through 90° about the axis of rotation of the shaft 62 for a predetermined period of time. These distributing ports 64 are in communication with four distributing outlet passages 90 which are formed through the wall of the valve body 300 at a predetermined angle to the radial direction thereof, as illustrated in FIGS. 17 and 19, which show representatively two of the four distributing ports 64. The four outlets of the distributing outlet passages 90 are in communication with the respective intake valve lifters IIIb through the steel pipes 20 of the fluid pressure supply passage IIb and pipe joints 21 and 22. Furthermore, the rotary distributor valve 6 is provided, in addition to the aforementioned four distributing passages 66, with four discharging grooves 65 which are formed in the wall of the distributing shaft 62, as shown in FIG. 14. These discharging grooves 65 are spaced from one another by 90° about the axis of the distributing shaft 62, as shown in FIG. 20, and are communicable with an annular discharging groove 67 formed between the distributing sleeve 62a and the inner periphery of the valve body 300, as shown in FIG. 20. The annular discharging groove 67 is in communication with the back pressure regulating orifice 97 at an oil outlet 99 in the valve body 300, as illustrated in FIG. 8, which back pressure regulating orifice 97 serves to control the back pressure in the operating fluid in the fluid pressure supply passage IIb by regulating the flow of the operating fluid out of the distributor valve 6, while a discharging groove 65 on the distributing shaft 62 is in communication with a distributing port 64 of the valve. In addition, the outlet of the back pressure regulating restricted orifice 97 communicates with the oil reservoir 6' through a steel pipe 20a and a pipe joint 21a, as shown in FIG. 13.

Figure 21:
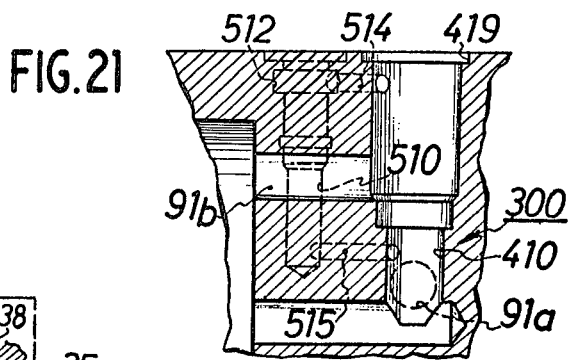

The operating fluid which is discharged from the trochoidal pump 91 is supplied to the rotary distributor valve 6 after being regulated to a predetermined pressure level sufficient for controlling the opening and closing operations of the intake valves 35 of the auxiliary combustion chambers of the respective engine cylinders by the pressure regulator valve 95, as shown in FIG. 16. The pressure regulator valve 95 comprises a cylindrical bore 410 which is in communication with the suction passage 91a of the engine lubricant oil feed system R, through passage 95b and a valve seat 411, which is forward in the cylinder 410, as shown in FIGS. 16 and 21. A narrow stepped piston 413 is abutted against the valve seat 411 by the action of a spring 412 of a predetermined spring constant. The piston 413 is slidable reciprocatingly in its axial direction under the influence of the fluid pressure acting on opposite sides of the stepped portion and the biasing action of the spring 412. By the reciprocating movement of the piston 413, the first fluid chamber 415 of the cylinder 410 is brought into or out of communication with the suction passage 91a. The outlet passage 91b of the pump is communicated with the first fluid chamber 415 through a passage 95a. The first fluid chamber 415 of the cylinder 410 is in communication with a second fluid chamber 417 formed between the upper stepped surface 416 and the cylinder 410 through a restricted passage 418, which is formed through the stepped portion of the piston 413. The second fluid chamber 417 is in communication with an inlet passage 421 of a pressure regulator pilot means 420, which is mounted integrally and in air-tight condition in the cylinder opening 419. The pressure regulator pilot means 420, serves to regulate the driving pressure of the intake valve 35 to a predetermined level, and comprises, between the inlet passage 421 and outlet passage 422, a fluid chamber wherein a valve seat 425 with a passage 423 and a valve member 426, which is biased toward the valve seat 425 by means of a spring 424 of a predetermined spring constant, are mounted. The pressure regulator pilot means 420 is provided with internal threads 427 at the outlet end thereof, in which a screw member 428 is threaded and abutted against the end portion of the spring member 424, so that the pressure of the spring member 424 on the valve member 426, that is to say, the pressure of the valve member 426 on the valve seat 425, may be adjusted simply by turning the screw 428 from outside for controlling the vent pressure of the second fluid chamber 417. It is only when the vent pressure overcomes the pressure of the valve member 426 acting on the valve seat 425 that the operating fluid is allowed to flow into the suction or inlet passage 91a through passages 421, 423, 422 and 429, with no further increases in the vent pressure.

The outlet passage 422 of the pressure regulator pilot means 420 is in communication with the suction passage 91a through the passage 429, which is formed axially through the stepped piston 413. Therefore, in order to maintain the intake valve opening pressure at a predetermined level, the pressure regulator valve 95 operates such that, when the operating fluid pressure which is discharged from the trochoidal pump 91 becomes greater than the level which is sufficient for opening the intake valve 35, the piston 413 is disengaged from the valve seat 411 against the action of the spring 412 due to the pressure difference of the operating fluid acting on the upper and lower surfaces 416 and 414 of the stepped portion of the piston 413, thus allowing the operating fluid to escape from the first fluid chamber 415 to the suction passage 91a so as to maintain a constant valve driving pressure. That is, the pressure of the operating fluid in the second fluid chamber 417, which communicates with the first fluid chamber 415 through the throttled passage 418, is controlled so as to be equal to the pressure which ultimately drives the intake valve 35. Such pressure control contributes to hold the pressure override to a minimum, particularly when there are large variations in the flow rate of the operating fluid which is discharged from the trochoidal pump 91.

Referring to FIG. 15, an unloading valve 50 is provided adjacent to the pressure regulator valve 95. The unloading valve 50 comprises a detector 51 which produces a signal for halting the opening and closing operation of the intake valve 35 upon detection of engine braking conditions and a cut-off valve 94 which cuts the pressure of the operating fluid generated by the fluid pressure supply device Ib upon receipt of a cut-off signal from the detector 51. The detector 51 includes, as shown in FIG. 15, a diaphragm type actuator 53, a switch element 54 and a DC power source B, or an engine battery. The diaphragm type actuator 53 is mounted securely on the cylinder head 106 and has two chambers 53a and 53b on opposite sides of a diaphragm member 52a. The chamber 53a communicates with the intake manifold of the engine through a rubber pipe 59 and a spring 52c of a predetermined spring constant is interposed therein, while the other chamber 53b communicates with the atmosphere. Fixed into the diaphragm member 52a is one end of a rod member 52b, and fixed into the other end of the rod member 52b is a movable contact 54a of the switch element 54. The spring constant of the spring member 52c is determined such that, during normal engine operations, except engine braking conditions, the combined force of the pressure from the intake manifold and the spring force of spring 52c overcomes the atmospheric pressure in the other chamber 53b, and such that, during the engine braking conditions, the atmospheric pressure in the chamber 53b overcomes the combined force to deform the diaphragm member 52a due to an increase of the pressure in the intake manifold. Stationary contacts 54c and 54b, which contact with the movable contact 54a of the switch element 54, are respectively connected to the negative and positive terminals of the DC power source B. Thus, during the engine braking conditions, the diaphragm 52a is deformed upwardly, as seen in FIG. 15, holding the movable contact 54a of the switch element 54 in contact with the stationary contacts 54b and 54c to energize the solenoid coil 50a of the electromagnetic on-off valve, which is employed as the cut-off valve 94.

As shown in FIG. 15, the cut-off valve 94 is provided in the form of a solenoid core 55. The cut-off valve 94 comprises a stepped valve member 511 which fits slidably in a bore 510 in the valve body 300 in a liquid-tight condition. One end of the valve member 511 is disposed in the solenoid coil 50a, which is mounted within a casing 501. A chamber 513 is formed between the lower circumferential wall of the valve member 511 and an annular groove 512 which is formed around the inner wall surface of the bore 510. The chamber 513 communicates with the second fluid chamber 417 of the feed pressure regulator valve 95 through an elongated passage 514 to introduce thereinto the vent pressure as a pressure for driving the intake valve 35. The bore 510 communicates at the bottom thereof with the suction passage 91a in the valve body 300 through an elongated passage 515 to supply thereto the delivery pressure of the gear pump G. The stepped portion of the valve member 511 is urged to be seated at the marginal edge of the open end of the bore 510 by a spring member 555 of a predetermined spring constant, which is abutted against the top end of the valve body 511. Thus, as soon as the detector 51 of the cut-off valve 94 detects engine braking conditions and produces a cut-off signal to energize the solenoid coil 50a, the valve body 511 is attracted by the solenoid coil 50a to move in the axial direction against the action of the spring member 555. Then, the fluid chamber 513 becomes fluidly communicated with the bottom portion of the bore 510, to lower the vent pressure of the fluid chamber 417 of the feed pressure regulator valve 95 to the same level as that of the fluid pressure in the suction passage 91a and halt the opening and closing operations of the intake valve 35. Except for such engine braking conditions, the solenoid coil 50a of the cut-off valve 94 is kept in a de-energized state by a signal from the detector 51. Namely, under such circumstances, the combined action of the pressure of the intake manifold in the diaphragm chamber 53a and the spring member 52c overcomes the atmospheric pressure in the other diaphragm chamber 53b, to hold the diaphragm 52a in the position shown in FIG. 15, so as to disengage the movable contact 54a of the switch element 54 from the stationary contacts 54b and 54c and to de-energize the solenoid coil 50a of the cut-off valve 94. The valve member 511 is seated at the marginal edge of the open end of the bore 510 under the influence of the action of the spring member 555 to block communication between the fluid chamber 513 and the bottom portion of the bore 510, thus maintaining at a predetermined level the vent pressure of the second fluid chamber 417 of the feed pressure regulator valve 95 to continue the opening and closing operations of the intake valve 35 of the auxiliary combustion chamber 76.

Figure 11:
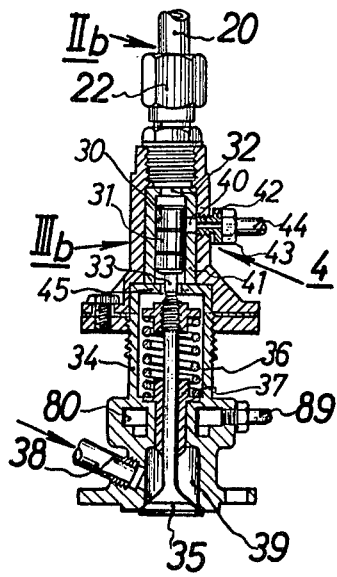
FIG. 11 is a vertical side view, partly in cross-section showing the intake valve lifter of the embodiment of FIGS. 8-10.

Referring now to FIGS. 10 and 11, the intake valve lifter IIIb is substantially the same as that of the second embodiment except for the following points. The intake valve body 34, which retains the intake valve 35 in position through the guide 37, is provided with a hollow cavity 80 around the circumference of its lower chamber 39 being in communication with a cooling water circulating passage 89 of a cooling system of a 4-cylinder in-line type water-cooled engine for cooling the cylindrical member 34, the intake valve 35 and the guide 37. Furthermore, in this instance, the intake valve lifter IIIb is mounted in a stepped bore 75 which is formed obliquely from above in the cylinder head over the main combustion chamber 77 for each engine cylinder of a 4-cylinder in-line type water-cooled engine with a cooling water circulating passage 89 of a cooling system and integrally with a hollow cylindrical member 71 which is also fit in the stepped bore 75, to form an auxiliary combustion chamber 76 for each main combustion chamber 77 of the engine. Each intake valve lifter IIIb is connected to a suitable one of the four distributing outlet passages 90 of the rotary distributor valve 6 of the fluid pressure supply device Ib through a steel pipe 20 and pipe joints 21 and 22.

As shown in FIGS. 10 and 12, the main combustion chamber 77 is connected to an intake pipe 108 and an exhaust pipe 104 through an intake valve 101 and an exhaust valve 102 in the manner as in known engines. The upstream end of the intake pipe 103 communicates with a fuel tank, not shown, of the fuel supply source through a carburetor, also not shown, for the main combustion chamber and a fuel cleaner, not shown. On the other hand, the exhaust pipe 104 discharges the exhaust gas from its downstream end in the well known manner through a silencer or the like. The main combustion chamber 77 is defined by the cylinder head 106 which mounts the valve operating mechanism 105 of the intake valve 101 and the exhaust valve 102, the cylinder block 108 which defines the cylinder 107, and the piston 111 which is reciprocable within the cylinder 107 through a connecting rod 110 and a crankshaft 109.

The operations performed by the internal combustion engine of the fifth embodiment with the above-described construction will now be discussed.

Assuming that the engine of the fifth embodiment is rotating at a constant speed, the driving shaft 114a of the trochoidal pump 91 of the fluid pressure supply device Ib is driven to make a one-half turn with every full revolution of the crankshaft 109, through the driving shaft 114 of the gear pump G of the engine lubricant oil feed system R, which is connected to the crankshaft 109 by a timing chain 304 to rotate at half the crankshaft speed. Accordingly, the inner rotor 402 of the trochoidal pump 91, which is mounted on the shaft 114a, and the outer rotor 403, rotating with the inner rotor 402, are driven, and as a result, the trochoidal pump 91 draws in the operating fluid which is discharged from the gear pump G of the engine lubricant oil feed system R through the oil filter OF of the check valve $V_1$. The operating fluid drawn into the trochoidal pump 91 is pressurized to a level slightly higher than the pressure level necessary for opening the intake valve 35 by the rotation of the inner and outer rotors 402 and 403 and is fed into the axial cavity 68 of the rotary distributor valve 6 and the feed pressure regulator valve 95, through the kidney-shaped port at the outlet end of pump 91.

The operating fluid discharged from the trochoidal pump 91 is regulated through the feed pressure regulator valve 95 to a predetermined pressure level suitable for controlling the opening and closing operations of the intake valve 35, such that the operating fluid which has been pressurized by the trochoidal pump 91 is led into the first fluid chamber 415 of the pressure regulator valve 95 to act on the stepped portion of the piston 413. The piston 413 is pushed upwardly from the valve seat 411 against the combined action of the spring 412 and the vent pressure of the operating fluid which is introduced into the second fluid chamber 417 through the restricted passage 418, thereby leading part of the operating fluid from the trochoidal pump 91 into the suction passage 91a. At the same time, the operating fluid, working as the vent pressure in the second fluid chamber 417, is led into the passage 423 through the inlet passage 421 of the pressure regulator pilot means 420, to move the valve member 426 away from the valve seat 425 against the action of the spring member 424 and then into the suction passage 91a of the trochoidal pump 91 through the outlet passage 422 of the drive pressure regulator pilot means 420 and internal passage 429 of the stepped piston 413. In this manner, the feed pressure regulator valve 95 regulates the pressure of the operating fluid which is fed from the trochoidal pump 91 to the axial inner cavity 68 of the rotary distributor valve 6 constantly at a level sufficient for controlling the opening and closing operations of the intake valve 35, by sending the excess of the operating fluid back to the suction passage of the trochoidal pump 91 through the passages formed between the stepped piston 413 and the valve seat 411 and between the valve member 426 and the valve seat 425 of the pressure regulator pilot means 420.

Thus, even if the rotational speed of the trochoidal pump 91 is varied according to the operating conditions of the engine, namely, even if the flow rate of the operating fluid from the trochoidal pump 91 is varied from a low to a high range, the feed pressure regulator valve 95 can control the pressure of the operating fluid to be supplied to the rotary distributor valve 6 constantly at a predetermined pressure level. The operating fluid regulated at the predetermined pressure level is fed from the delivery passage of the trochoidal pump 91 to the axial inner cavity 68 of the rotary distributor valve 6 through the annular feeding groove 63. As the distributing shaft 62 rotates, the four distributing passages 66 communicate in a predetermined timing with the four corresponding distributing outlet passages 90 in the valve body 300 through the ports 64 which are formed in the sleeve 62a corresponding to the four distributing passages 66, whereby the operating fluid is fed into the cylinder chamber 32 of the intake valve lifters IIIb on each engine cylinder through the respective steel pipe 20 of the fluid pressure supply passage IIb. The operating fluid introduced into the cylinder chamber 32 of the intake valve lifter IIIb pushes the piston 31 within the cylinder 30 axially downwardly, as seen in FIG. 11, thereby disengaging the intake valve 35 from its valve seat against the action of the spring through the rod-like member 33 at the fore end of the piston 31. As a result, the intake valve 35 opens the lower chamber 39 of the cylinder member 34 to supply the auxiliary combustion chamber 76 with a combustible mixture gas which is fed from a fuel supply or a carburetor. During the operation of opening the intake valve 35, the opening 40 in the side wall of the interposed cylindrical member 41 is uncovered when the piston 31 is stroked at a full distance in the valve opening direction. In this instance, the operating fluid acting to open the intake valve 35 is led to the oil reservoir 6' from the cylinder chamber 32 through the opening 40, throttled passage member 42 and steel pipe 44. While the operating fluid is led to the oil reservoir 6', the communication between the four distributing passages 66 of the shaft 62 with the corresponding four distributing outlet passages 90 is blocked by the rotation of the distributing shaft 62, thus completing one cycle of the opening and closing operations of the intake valves 35, whereupon intake valve 35 is again urged to rest on the valve seat by the action of the compression spring 36. As the shaft 62 rotates, the distributing outlet passage 90 of the valve body 300 is communicated with at least one exhaust groove 85 of the shaft 62 and the operating fluid in the cylinder chamber 32 of the intake valve lifter IIIb and in the steel pipe 20 is led to the oil reservoir 6' at a proper flow rate controlled by the back pressure regulating orifice 97. The operating fluid in the cylinder chamber 32 and steel pipe 20 is imparted with a back pressure by restricting the flow rate of the operating fluid to be sent to the oil reservoir 6' through the back pressure regulating orifice 97. By imparting the back pressure to the operating fluid, the intake valve promptly opens at a starting time of the succeeding cycle of the valve opening operation without opening time delays of the intake valve 35.

By the opening operation of the intake valve 35, a combustible mixture gas is fed to the auxiliary combustion chamber 76 from the carburetor and is ignited and burned in an ignition timing corresponding to the operating conditions of the engine by means of an ignition plug 72. The flames of the burning gas in the auxiliary combustion chamber 76 are injected into the main combustion chamber 77 at a predetermined angle through the passage 73, thereby igniting and burning the combustible mixture gas in the main combustion chamber 77. In this connection, as the combustible gas mixture supplied to the main combustion chamber 77 is ignited by the flames of burning gas in the auxiliary combustion chamber 76, even if it has an air-fuel ratio leaner than the theoretical mixing ratio, with small fuel consumption, certain ignition and combustion can be obtained and the harmful components of the exhaust gas can be eliminated.

In engine braking conditions, the detector 51 of the unloading valve 50 detects this condition and produces a signal for halting the opening and closing operations of the intake valves 35. Under such engine braking conditions, the pressure in the chamber 53a of the diaphragm type actuator 53, which communicates with the intake manifold of the engine, and the force of the spring 52c becomes smaller than the atmospheric pressure prevailing in the other chamber 53b of the actuator, to deform the diaphragm member 52 toward the chamber 53a. As a result, the rod member 52b which is integrally connected to the diaphragm 52a is moved upwardly, as seen in FIG. 15, to bring the movable contact 54a of the switch element 54 into contact with the stationary contacts 54b and 54c, energizing the solenoid coil 50a of the electromagnetic on-off valve, which acts as the cut-off valve 94. The valve member 511 of the cut-off valve 94 is thus attracted by the solenoid coil 50a upwardly from the position of FIG. 15, communicating the fluid chamber 513 with the bottom portion of the bore 510 to allow the operating fluid pressure in the second fluid chamber 417 to flow out into the suction passage 91a through passage 515, so that the pressure of the operating fluid supplied to the axial inner cavity 68 of the rotary distributor valve 6 is dropped to substantially the same level as that of the fluid which is discharged from the gear pump G, that is, to the level inactive for the control of the opening and closing operations of the intake valves 35. Therefore, the fuel supply to the auxiliary combustion chambers 76 is suspended so long as the respective intake valves 35 are held in the closed positions. Part of the lean combustible mixture gas which is supplied to the main combustion chamber 77 through the intake valve 101 is forced into the auxiliary combustion chamber 76 during the compression stroke of the piston 111 and ignited and burned by the spark which is produced by the ignition plug 72, and the flames of the burning gas are injected into the main combustion chamber 77 through the passage 73 to effect complete combustion of the lean mixture gas in the main combustion chamber 77. For this reason, the engine of the present embodiment can improve the rate of fuel consumption and reduce harmful components of the engine exhaust during such engine braking conditions.

As soon as the engine is placed in an operating condition other than an engine braking condition, the pressure in the chamber 53a of the diaphragm type actuator 53, which is in communication with the intake manifold of the engine, and the force of the spring 52c overcome the atmospheric pressure in the other chamber 53b, to deform the diaphragm member 52a toward the chamber 53b. As a result, the rod member 52b, which is connected integrally to the diaphragm member 52a, is moved downwardly, as seen in FIG. 15, to keep the movable contact 54a of the switch element 54 out of contact with the stationary contacts 54b and 54c, and the solenoid coil 50a of the cut-off valve 94 is de-energized. The valve member 511 of the cut-off valve 94 is thus urged to hold the position of FIG. 15 by the action of the spring 52c, without energizing the solenoid coil 50a. Therefore, the communication between the fluid chamber 513 and the bottom portion of the bore 510 of the cut-off valve 94 is blocked to maintain a predetermined pressure level of the operating fluid in the second fluid chamber 417 of the feed pressure regulator valve 95 for supplying the axial inner cavity 68 of the rotary distributor valve 6.

As described hereinabove, the internal combustion engine of the fifth embodiment is in the form of a multi-cylinder in-line type water-cooled engine, and a hydraulic valve control system is provided independently of the valve operating mechanism 105 for the intake and exhaust valves 101 and 102 of the main combustion chambers 77, so that it becomes possible to control the opening and closing operation of the intake valve 35 of the auxiliary combustion chamber 76 in an arbitrary phase without receiving limitations from the valve operating mechanism 105 of the main combustion chamber 77 and to provide a simplified construction of the valve control in a smaller space to permit a wider freedom in selecting the mounting position of the auxiliary combustion chamber 76 relative to the main combustion chamber 77.

In addition, the fifth embodiment has the practical advantage in that, in the fluid pressure supply device Ib, the operating fluid feed circuit leading to the trochoidal pump 91 and the rotary distributor valve 6 is connected to the engine lubricant oil feed system R to utilize the engine oil as the operating fluid.

Furthermore, into the intake valve lifter IIIb of the fifth embodiment, a fluid pressure releasing means for removing air bubbles, which might be mingled into or generated in the operating fluid, is added for positively letting air bubbles escape from the operating fluid and for ensuring and maintaining normal opening and closing operations of the intake valve 35 of the auxiliary combustion chamber 76. Since the operating fluid is positively let escape by the fluid pressure releasing means, in a predetermined timing, to the oil reservoir 6', the operating fluid is always maintained in a fresh state through the respective fluid circuits. The circulation of the operating fluid contributes to avoid the adverse effects on the hydraulic control of the intake valve 35 due to the heat which is generated in the fluid by frictional contact with various component parts and fluid passage walls or which is radiated from outside the passage walls as a result of the engine operation.

Moreover, the fifth embodiment has another important advantage that the rotary distributor valve 6 is provided with a back pressure regulating orifice 97 to regulate the back pressure in the operating fluid after completion of the valve opening operation, by controlling the flow of the operating fluid to the oil reservoir 6' and thereby preventing time delays in the succeeding opening and closing operation of the intake valve 35.

Also, in this embodiment a trochoidal pump supplying a constant output pressure is used as the operating fluid feeding pump means. It will be understood of course, that the trochoidal pump may be replaced by a gear pump or a vane pump, and there may be employed a plunger type pump of which the output pressure is variable for controlling the opening and closing operation of the intake valves, with necessary alterations in the structural design. An accumulator may be connected thereto, if desired, to ensure accurate operation at the time of engine start.

Instead of employing a trochoidal pump supplying a substantially constant output pressure, as in the fifth embodiment, it is possible to use a piston type pump, as described in the first embodiment, of which the output pressure is varied periodically in synchronism with the valve opening and closing periods and timing of the intake valve lifter. In this case, the communicating period and timing to the rotary distributor valve is determined in synchronism with the periodic time of the variation in the output pressure of the pump.

It may also be mentioned that the carburetor which is used in the fifth embodiment for supplying fuel to the auxiliary combustion chamber may be replaced by a fuel injection valve or the like.

An internal combustion engine according to a sixth embodiment of the invention is provided with a pressure pulsation suppressor in the fluid pressure supply passage which interconnects the fluid pressure supply and the intake valve lifter. The pressure pulsation suppressor comprises at least two intercommunicating chambers of different diameters for the purpose of diminishing or smoothing out the pressure pulsations which occur in the operating fluid in the fluid pressure supply passage, by applying resistance to or damping the generated pressure pulsations by means of the two chambers.

Figure 22:
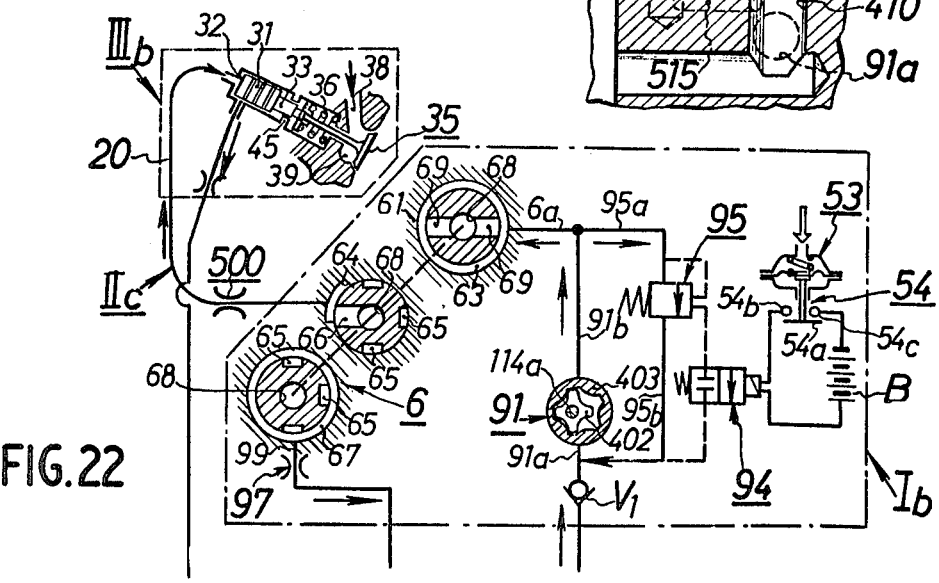
FIGS. 22 and 23 are a schematic view and a sectional view, respectively, showing the fluid pressure supply device in the internal combustion engine according to a sixth embodiment of the invention.
Figure 23:
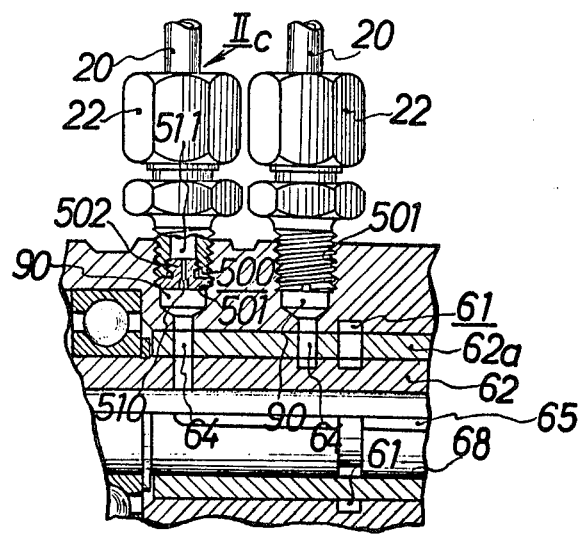

Referring then to FIGS. 22 and 23, the sixth embodiment is characterized by a pressure pulsation suppressor being added to the internal combustion engine of the fifth embodiment. The construction and operation of the sixth embodiment will become apparent from the following description which concentrates mainly on the differences from the engine of the fifth embodiment.

As shown in FIG. 22, the fluid pressure supply passage IIc is provided with a fluid pressure pulsation suppressor between each outlet end of the four distributing outlet passages 90 of the rotary distributor valve 6 and a steel pipe 20.

The fluid pressure pulsation suppressor is composed of externally threaded throttled passage members 500 which are screwed into internally threaded ports at the outlets 501 of the first to fourth distributing outlet passages and have an axially extending restricted passage 502 for flowing the operating fluid therethrough. The restricted passage member 500 is constructed so as to apply resistance to the flow of the operating fluid. Namely, the sectional area of the restricted passage 502 forming a first chamber 501 is made smaller than that of a second chamber 511 communicating with both the outlet port of the passage of the rotary distributor vlave 6 and the steel pipe 20.

Thus, the internal combustion engine of the sixth embodiment, with the abovementioned construction can perform, in addition to the operations of the engine of the fifth embodiment, the operation of damping the pressure pulsations which occur in the operating fluid in the fluid pressure supply passage IIc in a degree sufficient for controlling the opening and closing operations of the intake valve without difficulty.

In the internal combustion engine of the fifth embodiment as seen in FIGS. 8 and 9, periodical pressure changes occur in the operating fluid in the fluid pressure supply passage IIb when the operating fluid pressurized to a predetermined value is fed in a predetermined timing from the fluid pressure supply device Ib to the intake valve lifter IIIb through the fluid pressure supply passage IIb, or when the operating fluid is discharged in a predetermined time from the intake valve lifter IIIb of the fluid pressure supply device Ib through the fluid pressure supply passage IIb. These abrupt pressure changes generate the so-called pulsations in the operating fluid, which have effected the accurate control of the opening and closing operation of the intake valve at a predetermined pressure level. In other words, in the engine of the fifth embodiment, when the distributing ports 64 of the rotary distributor valve 6 are successively brought into communication with the discharging groove 65 from the distributing passages 66 by the rotation of the distributor valve 6, the intake valve 35 and the piston 31 are moved in the closing direction by the spring force of the spring 36 and the operating fluid in the cylinder chamber 32 is discharged into the groove 65 through the steel pipe 20. In this instance, when the piston 31 is abutted against a stopper 45 of FIG. 11 the operating fluid flowing through the steel pipe 20 is stopped abruptly against its inertia force, causing a corresponding pressure drop in the operating fluid. Due to the pressure variation of the operating fluid in the steel pipe 20, the operating fluid tends to flow from a higher to a lower pressure portion. As a result, the pressure in the operating fluid is repeatedly transmitted within the steel pipe 20, being reciprocated between the end of the piston 31 and the outlet end of the distributing outlet passage 90. It is feared that these pressure pulsations, due to the oil hammer phenomenon, can cause false operation, such as that of instantaneously opening the intake valve 35 when the correct condition is a closing period. Therefore, it is necessary to smooth out such pressure pulsations.

In this connection, this embodiment is provided with a restricted passage member 500 in the fluid pressure supply passage IIc, as mentioned hereinbefore. Even if an oil hammer phenomenon occurs within the steel pipe 20 due to the pressure variations in the operating fluid, this phenomenon is attenuated remarkably against the resistance of the throttled passage member 500, smoothing out abnormal pressure peaks and erasing the pressure pulsations to a sufficient degree. Thus, the internal combustion engine of this embodiment can ensure hydraulic intake valve control of high performance and high efficiency.

In order to suppress the pressure pulsations, the throttled passage member 500 is employed to resist the flow of the operating fluid for attenuation of the pulsations. However, it is also possible to attenuate the afore-1 entioned pressure variations by forming the diameter of the first chamber sufficiently larger than that of the supply passage. Alternatively, an operating fluid storing chamber, such as an oil tank, which has a sectional area larger than that of the steel pipe, or the supply passage, may be provided in the fluid pressure supply passage, thereby to damp the pressure variations in the operating fluid.

Furthermore, if a check valve is provided in the fluid pressure supply passage in the piston side for properly controlling the flowing or stopping condition of the operating fluid pressure between the rotary distributor valve and the back pressure regulating orifice passage of the fluid pressure supplying device, when the piston 31 is abutted to the stopper 45 and the flow of the operating fluid is abruptly stopped to cause the pressure drop thereof, the same pressure as the back pressure is introduced thereto and the pressure balance of the operating fluid is positively maintained to smooth out the pressure pulsations.

Therefore, the present invention may be summarized as follows. A first aspect of the invention is directed to an internal combustion engine comprising a piston slidably received in a cylinder for rotating an output shaft of the engine, a main combustion chamber defined between the piston and the cylinder head for igniting and burning a supplied air-fuel mixture, an auxiliary combustion chamber communicating with the main combustion chamber through a passage, an ignition plug connected to an ignition energy source and having its sparking end disposed in the auxiliary combustion chamber, an intake pipe communicated with the auxiliary combustion chamber and opened and closed by an intake valve, a fuel supply means, such as a carburetor or the like, for supplying an air-fuel mixture to the auxiliary combustion chamber through the inlet pipe, and further an intake valve lifter having a piston member which is operatively connected to the intake valve of the auxiliary combustion chamber and a cylinder member slidably receiving the piston member and forming therebetween a cylinder chamber, a fluid pressure supplying device driven in synchronism with the rotation of the engine for supplying fluid pressure, and a fluid pressure supply passage for feeding to the intake valve lifter a fluid pressure which is generated by the fluid pressure supplying device, the pressurized fluid which is generated by the fluid pressure supplying device being fed to the cylinder chamber of the intake valve lifter through the supply passage, thereby moving the piston to control the opening and closing operations of the intake valve of the auxiliary combustion chamber.

According to a second aspect of the invention, the cylinder member of the intake valve lifter of the first invention is provided with an opening in the side wall thereof in communication with an oil reservoir and in a position corresponding to a predetermined piston stroke length for circulating a predetermined amount of pressurized fluid on each stroke of the piston member, thereby letting entrained air and air bubbles escape from the operating fluid to ensure the correct opening and closing operation of the intake valve.

According to a third aspect of the invention the hydraulic circuit which controls the opening and closing operation of the intake valve as in the first aspect of the invention, is provided with an additional hydraulic circuit having an unloading valve and detecting means which detects particular operating conditions of the engine and is operatively connected to the unloading valve, whereby the valve is placed in a conductive state by means of the detecting means, upon detection of particular engine operating conditions, and the pressurized fluid which is supplied by the fluid pressure supply device in synchronism with the rotation of the engine, is let escape to the oil reservoir for temporarily halting the opening and closing operation of the intake valve by the intake valve lifter.

According to a fourth aspect of the invention, the fluid pressure supply device of the first aspect of the invention is further provided with a rotary distributor valve which comprises a rotating member being driven in synchronism with the rotation of the engine and having a number of predetermined fluid passages, and a valve body accommodating the rotating member and having a number of fluid passages communicable with the fluid passages of the rotating member for controlling in a predetermined order the opening and closing operations of a number of intake valves of auxiliary combustion chambers of a multi-cylinder internal combustion engine.

According to a fifth aspect of the invention, the fluid pressure supply passage of the first invention is further provided with a pulsation suppressor which comprises at least two inter-communicating chambers of different diameters for attenuating or smoothing out the pressure pulsations which occur in the operating fluid in the fluid pressure supply passage, the generated pulsations being attenuated by the attenuating action or resistance of the two chambers.

Obviously, many modifications and variations of the present invention are possible in light of these teachings. For example, though the invention has been described herein only in connection with a reciprocating engine, it may be applied to engines of other types, including rotary engines. Therefore, it is to be understood that within the scope of the appended claims, the invention may be practiced otherwise than as specifically described herein.

What is claimed as new and desired to be secured by letters patent of the United States is:

1. An internal combustion engine which comprises:
   a main combustion chamber for the combustion of an air fuel mixture;
   means for operating the control of opening and closing of an intake valve and an exhaust valve of said main combustion chamber;
   an auxiliary combustion chamber communicating with said main combustion chamber through a passage such that the ignition of an air-fuel mixture in said auxiliary combustion chamber induces ignition and combustion of the air-fuel mixture in said main combustion chamber;
   an intake valve provided in said auxiliary combustion chamber for opening and closing a passage connected to a fuel supply means therefor;
   an intake valve lifter having a piston member which is associated with said intake valve of said auxiliary combustion chamber and a cylinder member in which said piston member moves, said intake valve lifter further comprising an opening means provided in the side wall of said cylinder member thereof in communication with an oil reservoir and in a position corresponding to a predetermined piston stroke position, thereby to drain a predetermined amount of pressure fluid out of said cylinder member through said opening means on each compression stroke of said piston member;
   a fluid pressure supply device driven by said internal combustion engine to supply a fluid pressure for operating the control of opening and closing of said intake valve of said auxiliary combustion chamber separately and independently of the operation of said valve operating means of said main combustion chamber, said fluid pressure supply device further comprising a hydraluic circuit having an unloading valve in communication with said fluid pressure supply passage and an oil reservoir and a detecting means operatively connected to said unloading valve for detecting particular driving conditions of said internal combustion engine, thereby to turn said unloading valve in a conductive condition upon detecting particular driving conditions of said internal combustion engine, to allow the fluid pressure supplied by said fluid pressure supply device to escape to said oil reservoir, and to halt temporarily the control of the opening and closing operation of said intake valve by said intake valve lifter;
   a fluid pressure supply passage for feeding said fluid pressure being supplied by said fluid pressure supply device to said intake valve lifter whereby the fluid pressure generated by said fluid pressure supply device is fed through said fluid pressure supply passage to a cylinder chamber defined between said piston and cylinder members, said piston member is moved in synchronism with the rotation of said internal combustion engine and said intake valve of said auxiliary combustion chamber is controlled in the opening and closing operation thereof separately from and independently of the operation of said valve operating means of said main combustion chamber,
   a rotary distributor valve means comprising a rotary member driven in synchronized relation with the rotation of said internal combustion engine and provided with a number of predetermined fluid passages therein; and a casing rotatably supporting said rotary member and having a number of fluid passages in predetermined position relative to said rotary member on a side wall thereof, whereby the fluid pressure supplied to said fluid pressure supply device is fed to each cylinder chamber defined between the piston and cylinder members of the respective intake valve lifters of a number of auxiliary combustion chambers, in accordance with a predetermined ignition order of the respective combustion chambers, through said fluid passages of said rotary member and casing of said rotary distribution valve means when said rotary member is rotated and said fluid passages of said rotary member are communicated with those of said casing, and said intake valves of the respective auxiliary combustion chambers are controlled to open and close in a predetermined order and wherein, said fluid pressure supply device and said rotary distributing valve are integrally formed;

said fluid pressure supply device comprises a trochoidal pump comprising an inner rotor having a side wall of a trochoidal curve configuration driven by a drive shaft connected to a crankshaft of a four cylinder internal combustion engine by a timing chain mechanism and an outer rotor relatively rotatable to said inner rotor in a casing fixed integrally to a side wall of an engine block, a suction port of a valve plate of said trochoidal pump being connected to a gear pump of an engine lubricating pump through an oil filter and a check valve, a delivery port of a valve plate of said trochoidal pump being connected to a suction port of said pressure regulating valve, said pressure regulating valve comprising a cylinder, a valve seat formed in said cylinder, a hollow stepped piston having an orifice at the stepped part thereof and spring means reciprocatingly mounted in said cylinder, and a pressure regulator pilot means having a screw member provided in a casing, a valve member, spring means forcing said screw member and valve member, and a valve seat opposed to said valve member;

said rotary distributing valve means further comprises a cylinder fixed integrally to said side wall of said engine block on which an annular feeding groove is connected to said delivery port of said trochoidal pump, four distributing ports, having respectively a phase difference of 90°, each connected to four cylinders of said intake valve lifter and an annular discharging groove connected to said oil reservoir through a back pressure regulating restricted orifice, are respectively provided at a predetermined part of an inner wall thereof, and a distributing shaft, which is integrally connected to said drive shaft and has a bottom-closed axial inner cavity in an axial center thereof, a feeding passage extending radially therethrough, for distributing passages connecting said four distributing ports of said cylinder and said bottom-closed axial inner cavity in response to the rotation of said distributing shaft, and four discharging grooves having a phase difference of 90 degrees formed on an outer wall of said distributing shaft, said detecting means comprising a diaphragm type actuator having a first chamber with spring means connected to the intake manifold of said four cylinder engine and a second chamber connected to the atmosphere, divided by a diaphragm member, a switch element having a movable element connected to said diaphragm member, and a DC source connected to both terminals of said switch element;

said hydraulic circuit has an electromagnetic on-off valve as said unloading valve connected to said switch element of said detecting means which has one port communicated with a passage connecting said pressure regulating valve of said fluid pressure supply device and said check valve and the other part communicates with a vent pressure induction passage of said pressure regulating valve;

said intake valve lifter comprises four means corresponding to each of the cylinders of said four cylinder engine, each means comprising said cylinder member being integrally fixed to said cylinder head at a position according to each cylinder of said engine, said piston member interposed respectively in each of the bores of said cylinder member and connected through a rod member and spring means to said intake valve, the valve part of which is provided within a derby hat-shaped hollow member as said auxiliary combustion chamber having a spark plug, said intake valve reciprocably supported on the hollow cylindrical member having flange parts at both ends and a passage for cooling thereof, said flange parts integrally fixing said cylinder member and said derby hat-shaped member to said cylinder head, said hollow cylindrical member having a lower chamber connecting to a carburetor for said auxiliary combustion chamber through pipe means;

said fluid pressure supply passage comprises four steel pipes connected to said four distributing ports of said rotary distributing valve through a metal fitting and connecting to said four means of said intake valve lifter through metal fittings; and said opening means comprises an opening provided on each hollow cylindrical intermediate member which is interposed between said piston member and said cylinder bore of said cylinder member, said opening being connected to an oil pan as the oil reservoir through a throttle member disposed on the side wall of said cylinder member, metal fitting and a steel pipe, the position of said opening being decided in such a manner that the opening is normally closed when said piston member is not stroked and is opened to introduce the fluid pressure out of said cylinder member only when the piston is stroked.

2. An internal combustion engine according to claim 1, further comprising:

a pulsation suppressor comprising four hollow cylindrical throttle members having two throttled holes of different diameters and an outer surface having a screwed part for connecting with said metal fittings of said fluid pressure supply passage, said throttle members being respectively provided within the passages between said four distributing ports of said rotary distributing valve and said metal fittings of said fluid pressure supply passage.

* * * * *